US008837724B2

(12) United States Patent
Rose et al.

(10) Patent No.: US 8,837,724 B2
(45) Date of Patent: Sep. 16, 2014

(54) SYNCHRONIZATION TEST FOR DEVICE AUTHENTICATION

(75) Inventors: Gregory Gordon Rose, San Diego, CA (US); Lu Xiao, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1123 days.

(21) Appl. No.: 11/844,855

(22) Filed: Aug. 24, 2007

(65) Prior Publication Data

US 2008/0240440 A1    Oct. 2, 2008

Related U.S. Application Data

(60) Provisional application No. 60/908,271, filed on Mar. 27, 2007.

(51) Int. Cl.
| H04K 1/00 | (2006.01) |
| H04L 29/06 | (2006.01) |
| G06F 21/00 | (2006.01) |
| G06F 1/04 | (2006.01) |
| G06F 1/00 | (2006.01) |
| G06F 7/04 | (2006.01) |
| H04W 12/06 | (2009.01) |
| H04W 88/02 | (2009.01) |

(52) U.S. Cl.
CPC .............. *H04L 63/08* (2013.01); *H04W 88/02* (2013.01); *H04W 12/06* (2013.01)
USPC ........... 380/250; 380/247; 713/169; 713/186; 713/375; 713/500; 726/2; 726/29

(58) Field of Classification Search
USPC .......... 713/170, 169, 186, 375, 500; 380/237, 380/247, 250; 726/2, 29
See application file for complete search history.

(56) References Cited

U.S. PATENT DOCUMENTS

| 4,006,477 A | 2/1977 | Yost, Jr. et al. |
| 5,382,957 A | 1/1995 | Blume |
| 5,687,169 A | 11/1997 | Fullerton |

(Continued)

FOREIGN PATENT DOCUMENTS

| CN | 1432949 A | 7/2003 |
| CN | 1633660 A | 6/2005 |

(Continued)

OTHER PUBLICATIONS

International Search Report, PCT/US2008/058503, European Patent Office, Mar. 31, 2009.

(Continued)

*Primary Examiner* — Mohammad W Reza
(74) *Attorney, Agent, or Firm* — Won Tae Kim

(57) ABSTRACT

Device authentication is based on the ability of a human to synchronize the movements of his or her fingers. A pairing procedure for two wireless devices may thus involve a synchronization test that is based on the relative timing of actuations of input devices on each of the wireless devices. In some aspects a synchronization test involves determining whether actuations of user input devices on two different wireless devices occurred within a defined time interval. In some aspects a synchronization test involves comparing time intervals defined by multiple actuations of user input devices on two wireless devices.

85 Claims, 10 Drawing Sheets

(56) References Cited

U.S. PATENT DOCUMENTS

| | | | |
|---|---|---|---|
| 5,764,696 | A | 6/1998 | Barnes et al. |
| 5,812,081 | A | 9/1998 | Fullerton |
| 5,832,035 | A | 11/1998 | Fullerton |
| 5,907,427 | A | 5/1999 | Scalora et al. |
| 5,952,956 | A | 9/1999 | Fullerton |
| 5,960,031 | A | 9/1999 | Fullerton et al. |
| 5,963,581 | A | 10/1999 | Fullerton et al. |
| 5,969,663 | A | 10/1999 | Fullerton et al. |
| 5,970,148 | A | 10/1999 | Meier |
| 5,995,534 | A | 11/1999 | Fullerton et al. |
| 6,025,795 | A | 2/2000 | Hulderman et al. |
| 6,031,862 | A | 2/2000 | Fullerton et al. |
| 6,091,374 | A | 7/2000 | Barnes |
| 6,111,536 | A | 8/2000 | Richards et al. |
| 6,133,876 | A | 10/2000 | Fullerton et al. |
| 6,177,903 | B1 | 1/2001 | Fullerton et al. |
| 6,218,979 | B1 | 4/2001 | Barnes et al. |
| 6,295,019 | B1 | 9/2001 | Richards et al. |
| 6,297,773 | B1 | 10/2001 | Fullerton et al. |
| 6,300,903 | B1 | 10/2001 | Richards et al. |
| 6,304,623 | B1 | 10/2001 | Richards et al. |
| 6,332,193 | B1 * | 12/2001 | Glass et al. ............ 713/170 |
| 6,351,652 | B1 | 2/2002 | Finn et al. |
| 6,354,946 | B1 | 3/2002 | Finn |
| 6,400,307 | B2 | 6/2002 | Fullerton et al. |
| 6,400,329 | B1 | 6/2002 | Barnes |
| 6,421,389 | B1 | 7/2002 | Jett et al. |
| 6,430,208 | B1 | 8/2002 | Fullerton et al. |
| 6,437,756 | B1 | 8/2002 | Schantz |
| 6,462,701 | B1 | 10/2002 | Finn |
| 6,466,125 | B1 | 10/2002 | Richards et al. |
| 6,469,628 | B1 | 10/2002 | Richards et al. |
| 6,483,461 | B1 | 11/2002 | Matheney et al. |
| 6,489,893 | B1 | 12/2002 | Richards et al. |
| 6,492,904 | B2 | 12/2002 | Richards |
| 6,492,906 | B1 | 12/2002 | Richards et al. |
| 6,501,393 | B1 | 12/2002 | Richards et al. |
| 6,504,483 | B1 | 1/2003 | Richards et al. |
| 6,512,455 | B2 | 1/2003 | Finn et al. |
| 6,512,488 | B2 | 1/2003 | Schantz |
| 6,519,464 | B1 | 2/2003 | Santhoff et al. |
| 6,529,568 | B1 | 3/2003 | Richards et al. |
| 6,538,615 | B1 | 3/2003 | Schantz |
| 6,539,213 | B1 | 3/2003 | Richards et al. |
| 6,549,567 | B1 | 4/2003 | Fullerton |
| 6,552,677 | B2 | 4/2003 | Barnes et al. |
| 6,556,621 | B1 | 4/2003 | Richards et al. |
| 6,560,463 | B1 | 5/2003 | Santhoff |
| 6,571,089 | B1 | 5/2003 | Richards et al. |
| 6,573,857 | B2 | 6/2003 | Fullerton et al. |
| 6,577,691 | B2 | 6/2003 | Richards et al. |
| 6,585,597 | B2 | 7/2003 | Finn |
| 6,593,886 | B2 | 7/2003 | Schantz |
| 6,606,051 | B1 | 8/2003 | Fullerton et al. |
| 6,611,234 | B2 | 8/2003 | Fullerton et al. |
| 6,611,811 | B1 | 8/2003 | Deaton et al. |
| 6,614,384 | B2 | 9/2003 | Hall et al. |
| 6,614,387 | B1 | 9/2003 | Deadman |
| 6,621,462 | B2 | 9/2003 | Barnes |
| 6,636,566 | B1 | 10/2003 | Roberts et al. |
| 6,636,567 | B1 | 10/2003 | Roberts et al. |
| 6,636,573 | B2 | 10/2003 | Richards et al. |
| 6,642,903 | B2 | 11/2003 | Schantz |
| 6,650,894 | B1 | 11/2003 | Berstis et al. |
| 6,661,342 | B2 | 12/2003 | Hall et al. |
| 6,667,724 | B2 | 12/2003 | Barnes et al. |
| 6,670,909 | B2 | 12/2003 | Kim |
| 6,671,310 | B1 | 12/2003 | Richards et al. |
| 6,674,396 | B2 | 1/2004 | Richards et al. |
| 6,677,796 | B2 | 1/2004 | Brethour et al. |
| 6,700,538 | B1 | 3/2004 | Richards |
| 6,710,736 | B2 | 3/2004 | Fullerton et al. |
| 6,717,992 | B2 | 4/2004 | Cowie et al. |
| 6,748,040 | B1 | 6/2004 | Johnson et al. |
| 6,750,757 | B1 | 6/2004 | Gabig, Jr. et al. |
| 6,759,948 | B2 | 7/2004 | Grisham et al. |
| 6,760,387 | B2 | 7/2004 | Langford et al. |
| 6,762,712 | B2 | 7/2004 | Kim |
| 6,763,057 | B1 | 7/2004 | Fullerton et al. |
| 6,763,282 | B2 | 7/2004 | Glenn et al. |
| 6,774,764 | B2 | 8/2004 | Ghosh et al. |
| 6,774,846 | B2 | 8/2004 | Fullerton et al. |
| 6,774,859 | B2 | 8/2004 | Schantz et al. |
| 6,778,603 | B1 | 8/2004 | Fullerton et al. |
| 6,781,530 | B2 | 8/2004 | Moore |
| 6,782,048 | B2 | 8/2004 | Santhoff |
| 6,788,730 | B1 | 9/2004 | Richards et al. |
| 6,822,604 | B2 | 11/2004 | Hall et al. |
| 6,823,022 | B1 | 11/2004 | Fullerton et al. |
| 6,836,223 | B2 | 12/2004 | Moore |
| 6,836,226 | B2 | 12/2004 | Moore |
| 6,844,816 | B1 * | 1/2005 | Melton et al. ............ 340/572.1 |
| 6,845,253 | B1 | 1/2005 | Schantz |
| 6,847,675 | B2 | 1/2005 | Fullerton et al. |
| 6,862,575 | B1 | 3/2005 | Anttila et al. |
| 6,879,878 | B2 | 4/2005 | Glenn et al. |
| 6,882,301 | B2 | 4/2005 | Fullerton |
| 6,895,034 | B2 | 5/2005 | Nunally et al. |
| 6,895,236 | B2 | 5/2005 | Shuster |
| 6,898,434 | B2 | 5/2005 | Pradhan et al. |
| 6,900,732 | B2 | 5/2005 | Richards |
| 6,906,625 | B1 | 6/2005 | Taylor et al. |
| 6,907,244 | B2 | 6/2005 | Santhoff et al. |
| 6,907,270 | B1 | 6/2005 | Blanz |
| 6,912,240 | B2 | 6/2005 | Kumar et al. |
| 6,914,949 | B2 | 7/2005 | Richards et al. |
| 6,917,284 | B2 | 7/2005 | Grisham et al. |
| 6,919,838 | B2 | 7/2005 | Santhoff |
| 6,922,166 | B2 | 7/2005 | Richards et al. |
| 6,922,177 | B2 | 7/2005 | Barnes et al. |
| 6,925,109 | B2 | 8/2005 | Richards et al. |
| 6,933,882 | B2 | 8/2005 | Fullerton |
| 6,937,639 | B2 | 8/2005 | Pendergrass et al. |
| 6,937,663 | B2 | 8/2005 | Jett et al. |
| 6,937,667 | B1 | 8/2005 | Fullerton et al. |
| 6,937,674 | B2 | 8/2005 | Santhoff et al. |
| 6,947,492 | B2 | 9/2005 | Santhoff et al. |
| 6,950,485 | B2 | 9/2005 | Richards et al. |
| 6,954,480 | B2 | 10/2005 | Richards et al. |
| 6,959,031 | B2 | 10/2005 | Haynes et al. |
| 6,959,032 | B1 | 10/2005 | Richards et al. |
| 6,961,285 | B2 | 11/2005 | Niemiec et al. |
| 6,961,541 | B2 | 11/2005 | Overy et al. |
| 6,963,727 | B2 | 11/2005 | Shreve |
| 6,980,613 | B2 | 12/2005 | Krivokapic |
| 6,989,751 | B2 | 1/2006 | Richards |
| 7,002,473 | B2 | 2/2006 | Glick et al. |
| 7,003,289 | B1 | 2/2006 | Kolls |
| 7,010,290 | B2 | 3/2006 | Dent |
| 7,015,793 | B2 | 3/2006 | Gabig, Jr. et al. |
| 7,020,224 | B2 | 3/2006 | Krivokapic |
| 7,026,983 | B2 | 4/2006 | Spratt |
| 7,027,425 | B1 | 4/2006 | Fullerton et al. |
| 7,027,483 | B2 | 4/2006 | Santhoff et al. |
| 7,027,493 | B2 | 4/2006 | Richards |
| 7,030,806 | B2 | 4/2006 | Fullerton |
| 7,039,392 | B2 | 5/2006 | McCorkle et al. |
| 7,042,417 | B2 | 5/2006 | Santhoff et al. |
| 7,046,187 | B2 | 5/2006 | Fullerton et al. |
| 7,046,618 | B2 | 5/2006 | Santhoff et al. |
| 7,058,414 | B1 | 6/2006 | Rofheart et al. |
| 7,069,111 | B2 | 6/2006 | Glenn et al. |
| 7,075,476 | B2 | 7/2006 | Kim |
| 7,079,827 | B2 | 7/2006 | Richards et al. |
| 7,098,769 | B2 | 8/2006 | Ott |
| 7,099,367 | B2 | 8/2006 | Richards et al. |
| 7,099,368 | B2 | 8/2006 | Santhoff et al. |
| 7,116,266 | B1 | 10/2006 | Vesel et al. |
| 7,119,659 | B2 | 10/2006 | Bonalle et al. |
| 7,129,886 | B2 | 10/2006 | Hall et al. |
| 7,132,975 | B2 | 11/2006 | Fullerton et al. |
| 7,139,647 | B2 | 11/2006 | Larsen |
| 7,145,954 | B1 | 12/2006 | Pendergrass et al. |
| 7,148,791 | B2 | 12/2006 | Grisham et al. |

(56) References Cited

U.S. PATENT DOCUMENTS

| | | |
|---|---|---|
| 7,149,533 B2 | 12/2006 | Laird et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,178,719 B2 | 2/2007 | Silverbrook et al. |
| 7,181,192 B2 | 2/2007 | Panasik et al. |
| 7,184,938 B1 | 2/2007 | Lansford et al. |
| 7,188,244 B2 | 3/2007 | Matsuno |
| 7,190,722 B2 | 3/2007 | Lakkis et al. |
| 7,190,729 B2 | 3/2007 | Siwiak |
| 7,206,334 B2 | 4/2007 | Siwiak |
| 7,206,559 B2 | 4/2007 | Meade et al. |
| 7,209,724 B2 | 4/2007 | Richards et al. |
| 7,209,753 B2 | 4/2007 | Raith |
| 7,230,980 B2 | 6/2007 | Langford et al. |
| 7,239,277 B2 | 7/2007 | Fullerton et al. |
| 7,245,900 B1 | 7/2007 | Lamb et al. |
| RE39,759 E | 8/2007 | Fullerton |
| 7,256,727 B2 | 8/2007 | Fullerton et al. |
| 7,271,779 B2 | 9/2007 | Hertel |
| 7,308,356 B2 | 12/2007 | Melaku et al. |
| 7,310,532 B2 | 12/2007 | Knauerhase et al. |
| 7,363,494 B2 * | 4/2008 | Brainard et al. .............. 713/168 |
| 7,366,509 B2 | 4/2008 | Akgun et al. |
| 7,383,984 B2 | 6/2008 | Silverbrook et al. |
| 7,398,392 B2 | 7/2008 | Weber |
| 7,505,443 B2 | 3/2009 | McNew et al. |
| 7,554,979 B2 | 6/2009 | Ikeda |
| 7,581,113 B2 * | 8/2009 | Smith et al. .................. 713/184 |
| 7,724,705 B2 | 5/2010 | Erola et al. |
| 7,739,157 B2 | 6/2010 | Bonner et al. |
| 7,783,532 B2 | 8/2010 | Hsu et al. |
| 7,818,762 B2 | 10/2010 | Liu et al. |
| 7,870,021 B2 | 1/2011 | Mankoff |
| 7,870,229 B2 | 1/2011 | Spector |
| 2001/0014870 A1 | 8/2001 | Saito et al. |
| 2001/0042010 A1 | 11/2001 | Hassell |
| 2002/0002504 A1 | 1/2002 | Engel et al. |
| 2002/0004783 A1 | 1/2002 | Paltenghe et al. |
| 2002/0010627 A1 | 1/2002 | Lerat |
| 2002/0046084 A1 | 4/2002 | Steele et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0107738 A1 | 8/2002 | Beach et al. |
| 2002/0111140 A1 | 8/2002 | Kim |
| 2002/0111907 A1 | 8/2002 | Ling |
| 2002/0116271 A1 | 8/2002 | Mankoff |
| 2002/0128903 A1 | 9/2002 | Kernahan |
| 2002/0138345 A1 | 9/2002 | Dickson et al. |
| 2002/0138346 A1 | 9/2002 | Kodaka et al. |
| 2002/0169665 A1 | 11/2002 | Hughes et al. |
| 2002/0169668 A1 | 11/2002 | Bank et al. |
| 2002/0169892 A1 | 11/2002 | Miyaoku et al. |
| 2002/0178060 A1 | 11/2002 | Sheehan |
| 2002/0194303 A1 | 12/2002 | Suila et al. |
| 2003/0004808 A1 | 1/2003 | Elhaoussine et al. |
| 2003/0004821 A1 | 1/2003 | Dutta et al. |
| 2003/0055726 A1 | 3/2003 | Sohya et al. |
| 2003/0074259 A1 | 4/2003 | Slyman, Jr. et al. |
| 2003/0093283 A1 | 5/2003 | Morsa |
| 2003/0093314 A1 | 5/2003 | Leung et al. |
| 2003/0115152 A1 | 6/2003 | Flaherty |
| 2003/0117635 A1 | 6/2003 | Roberts |
| 2003/0158796 A1 | 8/2003 | Balent |
| 2003/0195806 A1 | 10/2003 | Willman et al. |
| 2003/0217153 A1 | 11/2003 | Rao et al. |
| 2003/0233190 A1 | 12/2003 | Jones |
| 2004/0054592 A1 | 3/2004 | Hernblad |
| 2004/0054732 A1 | 3/2004 | Carter et al. |
| 2004/0064351 A1 | 4/2004 | Mikurak |
| 2004/0117250 A1 | 6/2004 | Lubow et al. |
| 2004/0137886 A1 | 7/2004 | Ross et al. |
| 2004/0143500 A1 | 7/2004 | Lopez et al. |
| 2004/0158492 A1 | 8/2004 | Lopez et al. |
| 2004/0203963 A1 | 10/2004 | Shivaram et al. |
| 2004/0218574 A1 | 11/2004 | Sata et al. |
| 2004/0222302 A1 | 11/2004 | Matsumori |
| 2004/0233621 A1 | 11/2004 | Maeoka et al. |
| 2004/0240565 A1 | 12/2004 | Santhoff et al. |
| 2004/0243519 A1 | 12/2004 | Perttila et al. |
| 2004/0254836 A1 | 12/2004 | Emoke Barabas et al. |
| 2005/0027984 A1 | 2/2005 | Saito et al. |
| 2005/0038574 A1 | 2/2005 | Gila et al. |
| 2005/0040230 A1 | 2/2005 | Swartz et al. |
| 2005/0114213 A1 | 5/2005 | Smith et al. |
| 2005/0131761 A1 | 6/2005 | Trika et al. |
| 2005/0132234 A1 | 6/2005 | Dawson |
| 2005/0135304 A1 | 6/2005 | Wentink et al. |
| 2005/0138576 A1 | 6/2005 | Baumert et al. |
| 2005/0184145 A1 | 8/2005 | Law et al. |
| 2005/0200671 A1 | 9/2005 | Mistry et al. |
| 2005/0204152 A1 | 9/2005 | Breitbach |
| 2005/0230473 A1 | 10/2005 | Fajkowski |
| 2005/0237270 A1 | 10/2005 | Adams et al. |
| 2006/0003776 A1 | 1/2006 | Natori et al. |
| 2006/0014532 A1 | 1/2006 | Seligmann et al. |
| 2006/0015404 A1 | 1/2006 | Tran |
| 2006/0026070 A1 | 2/2006 | Sun |
| 2006/0030341 A1 | 2/2006 | Pham |
| 2006/0068822 A1 | 3/2006 | Kalhan |
| 2006/0073851 A1 | 4/2006 | Colando et al. |
| 2006/0074784 A1 | 4/2006 | Brown |
| 2006/0111967 A1 | 5/2006 | Forbes |
| 2006/0130100 A1 | 6/2006 | Pentland |
| 2006/0177030 A1 | 8/2006 | Rajagopalan et al. |
| 2006/0178932 A1 | 8/2006 | Lang |
| 2006/0180664 A1 | 8/2006 | Barrett et al. |
| 2006/0194569 A1 | 8/2006 | Hsueh |
| 2006/0293968 A1 | 12/2006 | Brice et al. |
| 2007/0017259 A1 | 1/2007 | Cho et al. |
| 2007/0043626 A1 | 2/2007 | Duvall et al. |
| 2007/0057051 A1 | 3/2007 | Bortolin et al. |
| 2007/0061302 A1 | 3/2007 | Ramer et al. |
| 2007/0087732 A1 | 4/2007 | Hsueh |
| 2007/0131759 A1 | 6/2007 | Cox et al. |
| 2007/0136657 A1 | 6/2007 | Blumenthal et al. |
| 2007/0136775 A1 | 6/2007 | MacKay et al. |
| 2007/0138270 A1 | 6/2007 | Reblin |
| 2007/0150339 A1 | 6/2007 | Retter et al. |
| 2007/0173266 A1 | 7/2007 | Barnes |
| 2007/0174116 A1 | 7/2007 | Keith et al. |
| 2007/0174259 A1 | 7/2007 | Amjadi |
| 2007/0182546 A1 | 8/2007 | Virk et al. |
| 2007/0200671 A1 | 8/2007 | Kelley et al. |
| 2007/0203792 A1 | 8/2007 | Rao |
| 2007/0241189 A1 | 10/2007 | Slavin et al. |
| 2007/0249288 A1 | 10/2007 | Moallemi et al. |
| 2007/0259690 A1 | 11/2007 | Julian et al. |
| 2007/0270129 A1 | 11/2007 | Luo |
| 2007/0276537 A1 | 11/2007 | Walker et al. |
| 2007/0285306 A1 | 12/2007 | Julian et al. |
| 2007/0287386 A1 | 12/2007 | Agrawal et al. |
| 2008/0040229 A1 | 2/2008 | Gholston |
| 2008/0052169 A1 | 2/2008 | O'Shea et al. |
| 2008/0072066 A1 * | 3/2008 | Vogler et al. .................. 713/187 |
| 2008/0074264 A1 | 3/2008 | Sharpe et al. |
| 2008/0120186 A1 | 5/2008 | Jokinen et al. |
| 2008/0133349 A1 | 6/2008 | Nazer et al. |
| 2008/0133366 A1 | 6/2008 | Evans et al. |
| 2008/0154827 A1 * | 6/2008 | Connors ........................ 706/46 |
| 2008/0167991 A1 | 7/2008 | Carlson et al. |
| 2008/0189170 A1 | 8/2008 | Ramachandra |
| 2008/0208688 A1 | 8/2008 | Byerley et al. |
| 2008/0221984 A1 | 9/2008 | Abhyanker |
| 2008/0238615 A1 | 10/2008 | Carpenter |
| 2008/0262928 A1 | 10/2008 | Michaelis |
| 2008/0270231 A1 | 10/2008 | Li et al. |
| 2008/0300970 A1 | 12/2008 | Scheibe |
| 2008/0300984 A1 | 12/2008 | Li |
| 2009/0061884 A1 | 3/2009 | Rajan et al. |
| 2009/0076911 A1 | 3/2009 | Vo et al. |
| 2009/0076912 A1 | 3/2009 | Rajan et al. |
| 2009/0088182 A1 | 4/2009 | Piersol et al. |

(56) References Cited

U.S. PATENT DOCUMENTS

| | | |
|---|---|---|
| 2009/0098903 A1 | 4/2009 | Donaldson et al. |
| 2009/0108064 A1 | 4/2009 | Fernandes et al. |
| 2009/0164309 A1 | 6/2009 | Mgrdechian et al. |
| 2009/0178144 A1 | 7/2009 | Redlich et al. |
| 2009/0233575 A1 | 9/2009 | Morrison |
| 2010/0153205 A1 | 6/2010 | Retter et al. |
| 2010/0185504 A1 | 7/2010 | Rajan et al. |
| 2010/0205043 A1 | 8/2010 | Edwards |
| 2010/0241574 A1 | 9/2010 | Salazar |
| 2010/0257020 A1 | 10/2010 | Bryant et al. |
| 2010/0280960 A1 | 11/2010 | Ziotopoulos et al. |
| 2010/0289640 A1 | 11/2010 | Annamalai |
| 2010/0299224 A1 | 11/2010 | Borom et al. |
| 2011/0028160 A1 | 2/2011 | Roeding et al. |
| 2011/0119132 A1 | 5/2011 | Morton et al. |
| 2011/0215138 A1 | 9/2011 | Crum |
| 2011/0276385 A1 | 11/2011 | Keller |

FOREIGN PATENT DOCUMENTS

| | | |
|---|---|---|
| CN | 1672382 | 9/2005 |
| CN | 1694122 A | 11/2005 |
| CN | 1716223 A | 1/2006 |
| CN | 1799061 A | 7/2006 |
| CN | 1879121 A | 12/2006 |
| CN | 101384031 A | 3/2009 |
| EP | 1758308 A1 | 2/2007 |
| EP | 1926335 A1 | 5/2008 |
| JP | 11353555 A | 12/1999 |
| JP | 2000275328 A | 10/2000 |
| JP | 2001034658 A | 2/2001 |
| JP | 2002074131 A | 3/2002 |
| JP | 2002109237 A | 4/2002 |
| JP | 2002149945 A | 5/2002 |
| JP | 2002525641 A | 8/2002 |
| JP | 2002251555 A | 9/2002 |
| JP | 2002279274 A | 9/2002 |
| JP | 2002291047 | 10/2002 |
| JP | 2002374261 A | 12/2002 |
| JP | 2003006543 A | 1/2003 |
| JP | 2003023367 A | 1/2003 |
| JP | 2003051771 | 2/2003 |
| JP | 2003067606 A | 3/2003 |
| JP | 2003187140 A | 7/2003 |
| JP | 2003208381 A | 7/2003 |
| JP | 2003256705 A | 9/2003 |
| JP | 2003263582 A | 9/2003 |
| JP | 2004094543 A | 3/2004 |
| JP | 2004516989 A | 6/2004 |
| JP | 2004220522 A | 8/2004 |
| JP | 2004236166 A | 8/2004 |
| JP | 2004248215 A | 9/2004 |
| JP | 2004272463 A | 9/2004 |
| JP | 2004326303 A | 11/2004 |
| JP | 2004328542 A | 11/2004 |
| JP | 2004362470 A | 12/2004 |
| JP | 2005011318 A | 1/2005 |
| JP | 2005020350 A | 1/2005 |
| JP | 2005045756 A | 2/2005 |
| JP | 2005078173 A | 3/2005 |
| JP | 2005128903 A | 5/2005 |
| JP | 2005128965 A | 5/2005 |
| JP | 2005141686 A | 6/2005 |
| JP | 2005209114 A | 8/2005 |
| JP | 2005528016 A | 9/2005 |
| JP | 2005533316 A | 11/2005 |
| JP | 2005534260 A | 11/2005 |
| JP | 2006011806 A | 1/2006 |
| JP | 2006018511 A | 1/2006 |
| JP | 2006018824 A | 1/2006 |
| JP | 2006020004 A | 1/2006 |
| JP | 2006091355 A | 4/2006 |
| JP | 2006129000 A | 5/2006 |
| JP | 2006139431 A | 6/2006 |
| JP | 2006197458 | 7/2006 |
| JP | 2006227901 A | 8/2006 |
| JP | 2006295249 A | 10/2006 |
| JP | 2007502087 A | 2/2007 |
| JP | 2007201851 A | 8/2007 |
| JP | 2007213276 A | 8/2007 |
| JP | 2008225540 A | 9/2008 |
| JP | 2008293123 A | 12/2008 |
| JP | 2009188922 | 8/2009 |
| JP | 2010515168 A | 5/2010 |
| KR | 1020020068945 | 8/2002 |
| KR | 20020096946 A | 12/2002 |
| KR | 20030018741 A | 3/2003 |
| KR | 20040069122 A | 8/2004 |
| KR | 100512362 B1 | 9/2005 |
| KR | 20060014942 A | 2/2006 |
| KR | 20060018235 A | 2/2006 |
| KR | 20060064222 A | 6/2006 |
| KR | 20060124430 A | 12/2006 |
| KR | 20070016301 | 2/2007 |
| RU | 2150790 C1 | 6/2000 |
| RU | 2267156 C2 | 12/2005 |
| RU | 20050100782 | 2/2006 |
| RU | 2301450 C2 | 6/2007 |
| TW | 1228364 | 2/2005 |
| TW | 1252324 | 4/2006 |
| TW | 1252628 | 4/2006 |
| TW | 1252639 | 4/2006 |
| TW | 1252671 | 4/2006 |
| WO | WO9613920 A1 | 5/1996 |
| WO | WO0178423 A1 | 10/2001 |
| WO | 0221478 | 3/2002 |
| WO | WO0225823 | 3/2002 |
| WO | 0250732 A1 | 6/2002 |
| WO | WO02054353 A1 | 7/2002 |
| WO | WO03107289 | 12/2003 |
| WO | 2004008276 A2 | 1/2004 |
| WO | WO-2004014037 A1 | 2/2004 |
| WO | WO-2005045455 A2 | 5/2005 |
| WO | WO-2005064515 A1 | 7/2005 |
| WO | WO-2005110208 A1 | 11/2005 |
| WO | 2005122483 A1 | 12/2005 |
| WO | WO2006030341 A1 | 3/2006 |
| WO | WO2006092772 A1 | 9/2006 |
| WO | 2007026745 A1 | 3/2007 |
| WO | WO2008027965 | 3/2008 |
| WO | 2008146576 A1 | 12/2008 |
| WO | WO2008157806 | 12/2008 |

OTHER PUBLICATIONS

Written Opinion of the International Searching Authority, PCT/US2008/058503, Mar. 31, 2009.
Co-pending U.S Appl. No. 13/048,060, filed on Mar. 15, 2011.
Co-pending U.S. Appl. No. 13/363,580, filed on Feb. 1, 2012.
Bardia Alavi, et al., "Indoor Geolocation Distance Error Modeling using UWB Channel Measurements", 2005 IEEE 16th International Symposium on Personal, Indoor and Mobile Radio Communications, Sep. 11-14, 2005.
Blundo, C. et al.: "Secure E-Coupons," Electronic Commerce Research, vol. 5, No. 1, pp. 117-139, Kluwer, Dordrecth, NL, (Jan. 1, 2005), XP002380651, ISSN: 1389-5753, Section 8.4.
Okazaki, "Eight Methods for Capitalizing on Access Log Analysis, which are Essential to SEO, Marketing and Redesign", Web Creators, NdN Corporation, Japan, Mar. 1, 2005, vol. 39, pp. 148-155.
"Examples of Judging whether Business-Related Inventions are Patentable" http://www.jpo.go.jp/tetuzuki/t_tokkyo/bijinesu/biz_pat_case.htm.; Apr. 18, 2003.
Lester, J et al., "Are You With Me ?—Using Accelerometers to Determine if Two Devices are Carried by the Same Person", LNCS, Pervasive Computing, Apr. 2004,vol. 3001, pp. 33-50.
Roumeliotis, T., "Five geofencing ideas for mobile marketing from brands and retailers," Mobile Commerce Daily, Jul. 16, 2010, 2 pages, Retrieved from http://www.mobilecommercedaily.com/five-geofencing-ideas-for-mobile-marketing-from-brands-and-retailers.

* cited by examiner

SYNCHRONIZATION TEST FOR DEVICE AUTHENTICATION

CLAIM OF PRIORITY UNDER 35 U.S.C. §119

This application claims the benefit of and priority to commonly owned U.S. Provisional Patent Application No. 60/908,271, filed Mar. 27, 2007, the disclosure of which is hereby incorporated by reference herein.

BACKGROUND

1. Field

This application relates generally to wireless communication and more specifically, but not exclusively, to synchronization tests for device authentication.

2. Background

Wireless devices may employ a pairing process in an attempt to form a level of trust with one another in conjunction with authenticating with each other or exchanging cryptographic keys that may be used for services that are protected by cryptographic techniques. For example, in Bluetooth, authentication between two devices may involve the exchange of a passcode between the devices. In some implementations such a procedure may involve the use of a sophisticated user interface for passcode input. Conversely, in implementations that employ relatively simple user interface devices for passcode input, the associated provisioning cost may be relatively high. Moreover, a typical passcode used by users may be four to eight digits long, which may not be strong enough to prevent the security of the devices from being compromised by conventional cryptanalysis.

Bluetooth V2.1 proposes using elliptic curve Diffie-Hellman for key exchange. Here, based on a secret derived from elliptic curve Diffie-Hellman, device authentication may be based on numeric comparison or passkey entry. However, these methods may utilize a sophisticated user interface and may be relatively susceptible to man-in-the-middle attacks.

Near field communication technology also may be used for device authentication. For example, near field communication devices may be designed to perform a handshake only when they are brought within a defined "touching" distance of each other. It may be possible, however, to design a near field communication device with a custom antenna that extends the working distance for the handshake. In this case, an unauthorized person or device may be able to authenticate with another device from relatively long range thereby thwarting the security otherwise provided the requirement of relatively close proximity of the devices. Consequently, authentication that is based on a relatively small touching distance as provided by near field communication may not provide a sufficient level of security.

SUMMARY

A summary of sample aspects of the disclosure follows. It should be understood that any reference to aspects herein may refer to one or more aspects of the disclosure.

The disclosure relates in some aspects authenticating devices or performing other similar operations based on the ability of a human to synchronize the movements of his or her fingers. For example, a person may be able to press or release two buttons in a simultaneous manner or in a substantially simultaneous manner. In contrast, it may be relatively difficult for an onlooker to anticipate and synchronize to the timings of the finger movements of the other person. Consequently, a pairing procedure for two wireless devices may involve a synchronization test that is based on the relative timing of actuations of input devices on each of the wireless devices. Here, it is unlikely that an onlooker would be able to press or release a button on his or her own wireless device in an attempt to interfere with the pairing of the wireless devices by the other person.

In some aspects, for purposes of device authentication, presence management, or other operations a pair of wireless devices may be deemed trustable with respect to one another if the same person is physically holding the two wireless devices. Consequently, when two wireless devices being held by the same person communicate with each other, a message sent by a first one of the wireless devices relating to a local synchronization event (e.g., actuation of a user input device) at the first device may be deemed trustable by a second one of the wireless devices that receives the message. To ensure that the same person is holding the devices, the receiving device verifies that the timing of the received message is substantially synchronized with a similar local synchronization event at the second device. Consequently, an authentication or other similar procedure may involve determining whether an input device on a first device is actuated (e.g., depressed and/or released) at substantially the same time or times that an input device on a second device is actuated.

The disclosure relates in some aspects to a synchronization test that involves determining whether actuations of user input devices on two different wireless devices occurred within a defined time interval with respect to one another. Here, a user may be instructed to simultaneously actuate a user input device on each wireless device. A first one of the wireless devices may determine the actuation time associated with a second one of the wireless devices based on the time at which the first device receives a message from the second device relating to the actuation of the second device. The first device may thus compare the actuation time of its user input device with the time it received the message from the second device. The second device may perform a similar synchronization test. In the event the synchronization tests pass on both devices, the devices may authenticate one another. In some aspects a cryptographic key agreement scheme may be employed in conjunction with the synchronization tests. In addition, in some aspects the synchronization tests may be based on the timings of more than one actuation of each user input device.

The disclosure relates in some aspects to a synchronization test that involves comparing time intervals between multiple actuations of user input devices on two different wireless devices. Here, a user may be instructed to simultaneously actuate a user input device on each wireless device in a repeated (e.g., random) manner. That is, the user may repeatedly actuate each user input device at the same time. In this way a set of time intervals corresponding to the times between actuations will be defined on each wireless device. Each of the devices may then send a commitment value (e.g., a hash code or a message authentication code) that is based on its set of time intervals to the other device. The description that follows describes the use of a hash value, a message authentication code or other schemes to illustrate sample ways to implement a commitment scheme. It should be appreciated that other cryptographic techniques may be used to generate a commitment value in accordance with the teachings herein. As one step of the verification process, each of the devices may compare an actuation time of its user input device with the time it received the commitment (e.g., hash) message from the other device. Assuming this step of the verification process passes, after a delay period the devices may each send its set of time intervals to the other device. In this way, in another step of the verification process the devices may determine whether corresponding pairs of time intervals from each of the two sets of time intervals are sufficiently similar. In addition, in yet another step of the verification process, the devices may generate a commitment (e.g., hash) value based on the set of time intervals it received from the other device and compare that commitment value with the commitment value it previously received from the other device to verify that both received messages relate to the same set of time intervals. In the event the synchronization tests pass on both devices, the devices may authenticate one another.

BRIEF DESCRIPTION OF THE DRAWINGS

These and other aspects of the disclosure will be more fully understood when considered with respect to the following detailed description, appended claims, and accompanying drawings, wherein:

FIG. 3, including

FIG. 5, including

Figure 1:
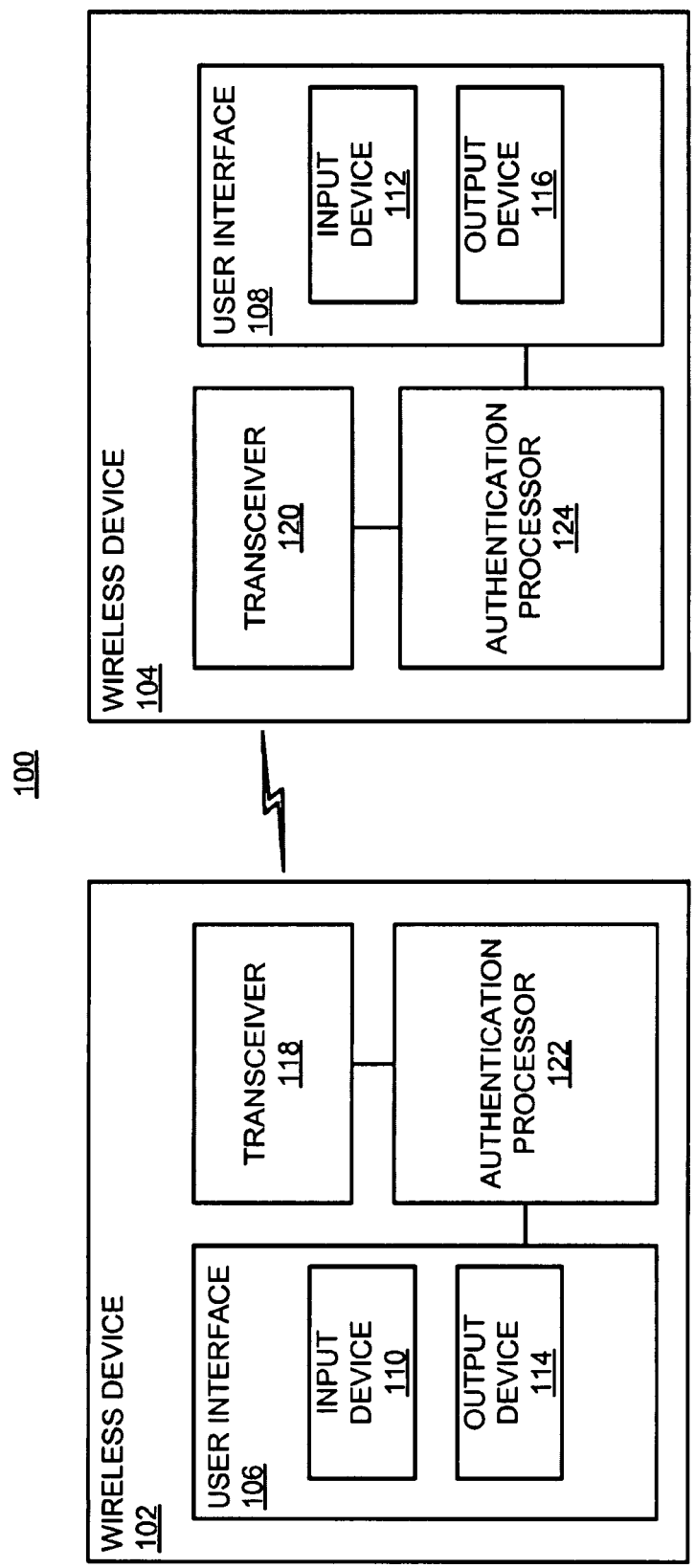
FIG. 1 is a simplified block diagram of several sample aspects of a communication system comprising wireless devices.

The various features illustrated in the drawings may not be drawn to scale and may be simplified for clarity. Consequently, the drawings may not depict every aspect of a particular apparatus (e.g., device) or method. In addition, similar reference numerals may be used to denote similar features herein.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of the above, as discussed below first and second actuation timing-related indications may be compared to determine whether at least one time of actuation of a first user input device is sufficiently similar to at least one time of actuation of a second user input device. In some aspects each of the at least one time of actuation of the first and second user input devices relates to a single time of actuation of each input device. In contrast, in some aspects each of the at least one time of actuation of the first and second user input devices relates to a set of time intervals defined by a series of actuations of each of the input devices.

FIG. 1 illustrates sample aspects of a communication system 100 where a first wireless device 102 may be paired with a second wireless device 104. This pairing may be performed in conjunction with, for example, an authentication procedure relating to establishing communication between the devices 102 and 104, a presence management operation that involves the devices 102 and 104, or some other operation that involves an interaction between the devices 102 and 104 where the interaction is predicated on a determination that the other device is trustworthy. For convenience, FIG. 1 and the discussion that follows may generally refer to a pairing process between two wireless devices. It should be appreciated, however, that the teachings herein may be adaptable to creating trust between more than two devices and that such devices need not be wireless.

Sample operations of the system 100 will be discussed in more detail in conjunction with the flowchart of FIG. 2. For convenience, the operations of FIG. 2 (or any other operations discussed or taught herein) may be described as being performed by specific components (e.g., system 100). It should be appreciated, however, that these operations may be performed by other types of components and may be performed using a different number of components. It also should be appreciated that one or more of the operations described herein may not be employed in a given implementation.

Figure 2:
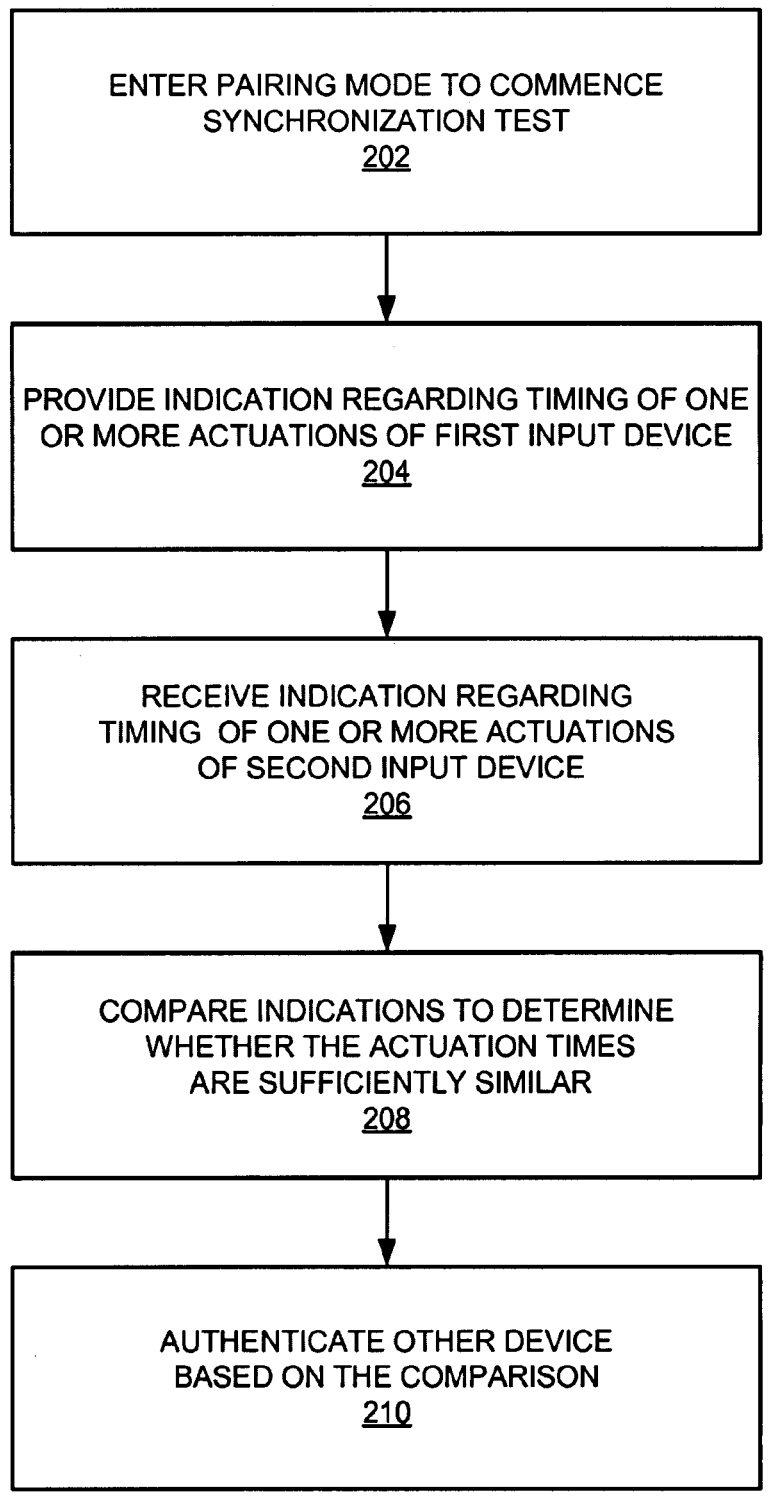
FIG. 2 is a flowchart of several sample aspects of operations that may be performed to authenticate two or more devices.

As represented by block 202 of FIG. 2, at some point in time a decision may be made to pair the devices 102 and 104. As an example, a user may wish to use a wireless headset (e.g., device 104) with his or her cell phone (e.g., device 102). Here, it may be desirable to ensure that any communication between the headset and the cell phone remains private. Accordingly, in conjunction with the pairing operation the devices 102 and 104 may exchange one or more cryptographic keys that are then used to secure (e.g., encrypt) any messages sent between the devices 102 and 104. Before exchanging such keys, however, each device 102 and 104 may wish to ensure that it is communicating with the intended device and not some other unauthorized device that may be attempting to compromise communication of either one or both of the devices 102 and 104. Accordingly, in accordance with some aspects of the disclosure a pairing process based on one or more synchronization tests may be employed to enable the devices 102 and 104 to verify whether they are indeed communicating with a trusted device.

In some aspects the pairing mode may be initiated through the use of user interfaces 106 and 108 of the devices 102 and 104, respectively. For example, a user may actuate input devices 110 and 112 of the user interfaces 106 and 108, respectively, to commence the pairing mode. In conjunction with these operations, the user interfaces 106 and 108 may respectively include output devices 114 and 116 that provide one or more indications relating to the progress of the pairing mode operations. As an example, once the devices 102 and 104 are ready to commence a synchronization test an appropriate indication may be generated by one or both of the output devices 114 and 116 to inform the user that he or she should simultaneously actuate the input devices 110 and 112.

The user interfaces 106 and 108 may be implemented in a variety of ways. For example, in some implementations, each device 102 and 104 has a user input device (e.g., a button-type switch) and at least one of the devices 102 and 104 has a relatively simple user output device (e.g., a LED). As an example, a device 102 (e.g., a mobile phone) may have a keypad and a display screen that may serve as the user input device 110 and the user output device 114, respectively. The device 104 may then simply employ a button or some other user input device 112 that the user may actuate in conjunction with the actuation of the keypad. In this case, an indication may be provided on the display screen to inform the user when to commence simultaneous actuation of the input devices 110 and 112.

In general, a user input device may comprise one or more of a variety of components that enable a user to provide some form of input to an associated device. For example, the user input device may comprise one or more switches such as a pushbutton or a keypad. The user input device also may comprise a touch-screen, a touchpad, or other similar input mechanism. The user input device may comprise a pointing device such as a mouse, trackball, an electronic pen, a pointing stick, etc. The user input device also may be adapted to receive other forms of input such as an audio (e.g., voice) input, an optical-based input, an RF-based input, or some other suitable form of input.

As represented by block 204 of FIG. 2, each of the devices 102 and 104 provide one or more indications relating to the timing of one or more actuations of its respective input device. For example, as will be discussed in more detail in conjunction with FIG. 3, this indication may relate to the time at which an input device was actuated. Alternatively, as will be discussed in conjunction with FIG. 5, this indication may relate to a set of time intervals defined by multiple actuations of an input device.

To enable each device to compare its actuation timing with the actuation timing of the other device, each of the devices may transmit one or more indications relating to its actuation timing to the other device. For example, upon actuation of the input device 110 a transceiver 118 (e.g., including transmitter and receiver components) of the device 102 may transmit a message to a similar transceiver 120 of the device 104 to indicate that the input device 110 has been actuated. In addition, the indication may include information relating to the timing of that actuation (e.g., the time of actuation or a set of time intervals defined by multiple actuations). As discussed below conjunction with FIG. 5, the indication also may comprise a commitment value (e.g., a hash code or a message authentication code) that is based on a set of time intervals generated at block 204.

As represented by block 206, the device 104 (e.g., the transceiver 120) may thus receive one or more indications from the device 102 relating to the timing of one or more actuations for the device 102, and vice versa. As mentioned above, in some implementations the indication of block 206 may simply comprise the time at which a message was received from the other device.

As represented by block 208, authentication processors 122 and 124 on each device may then compare one or more indications relating to its actuation timing with one or more received indications that relate to the actuation timing of the other device. For example, as discussed below conjunction with FIG. 3 the authentication processor 124 may use the time of receipt of the message from the device 102 as an indication of the time of actuation of the input device 110. The authentication processor 124 may then compare that time of receipt with the time of actuation of its input device 112 to determine whether the actuations were sufficiently synchronized. Alternatively, as discussed below conjunction with FIG. 5 the authentication processor 124 may compare a received set of time intervals with its own set of time intervals and/or compare commitment (e.g., hash) values generated from these different sets of time intervals. In some implementations the above comparison operations may employ one or more time duration threshold values that define maximum allowable deviations between the timings of the indications of the two devices. Concurrently with the above operations, the authentication processor 122 may perform similar comparison operations for its indication(s) and the indication(s) that it receives from the device 104.

As represented by block 210, if the results above the above synchronization tests indicate that there is a sufficient probability that the input devices 110 and 112 were actuated by the same person, the devices 102 and 104 may complete the pairing process. For example, in some implementations the authentication processor 122 of the device 102 may authenticate the device 104, and the authentication processor 124 of the device 104 may authenticate the device 102. In conjunction with this operation or at some other point in time, the devices 102 and 104 may exchange or otherwise cooperate to create one or more cryptographic keys to facilitate secure communications between the devices or to facilitate some other form of device interaction.

In some implementations the synchronization test may be performed before the commencement of an authentication procedure (e.g., as a prerequisite to commencing an authentication procedure) or as part of an authentication procedure. In addition, in some implementations a synchronization test may serve as both a prerequisite to an authentication procedure and form a part of an authentication procedure.

Figure 3A:
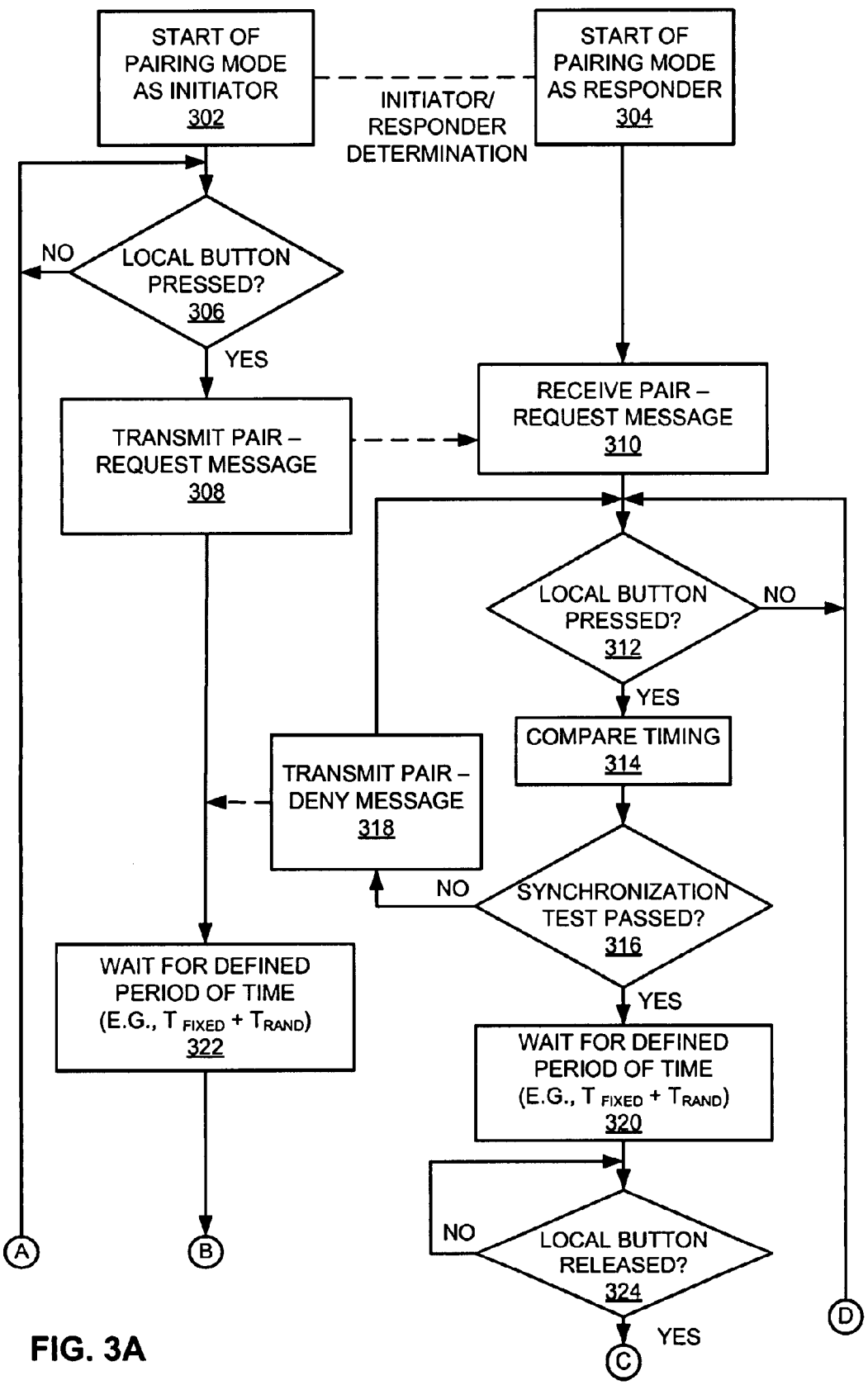
FIGS. 3A and 3B, is a flowchart of several sample aspects of operations that may be performed to pair two wireless devices based on the time difference between an actuation of a user input device of each wireless device.
Figure 3B:
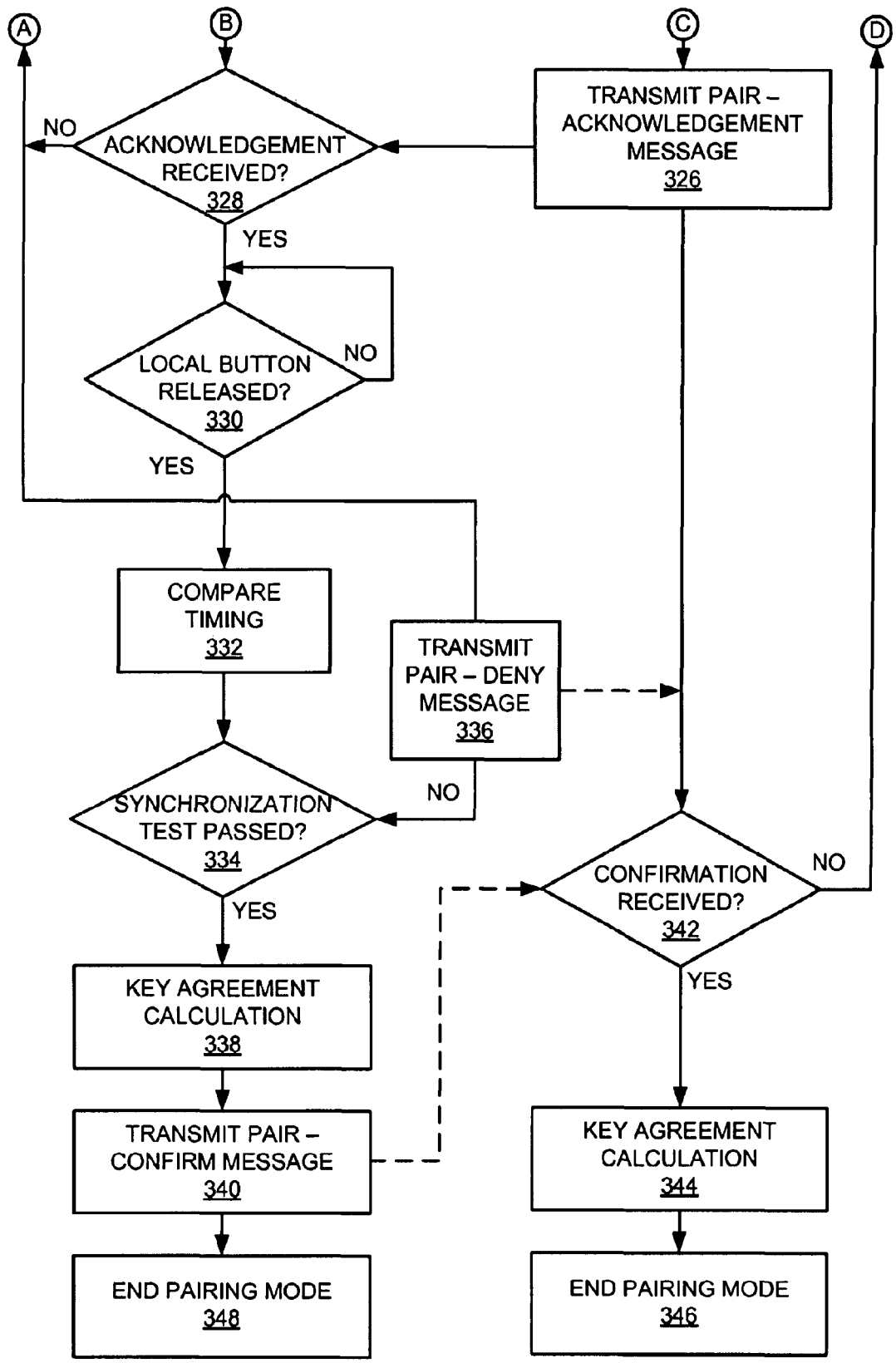

With the above overview in mind, additional details relating to one type of synchronization test will be discussed in conjunction with the flowchart of FIG. 3. In general, the blocks on the left side of FIG. 3 relate to operations that may be performed by a wireless device (e.g., device 102 of FIG. 1) that initiates the pairing mode while the blocks on the right side of FIG. 3 relate to operations that may be performed by another wireless device (e.g., the device 104 of FIG. 1) that responds to the initiation of the pairing mode. Here, it should be appreciated that the specific sequence of operations depicted in FIG. 3 is for illustration purposes only, and that different circumstances may involve different sequences of operations.

Figure 4:
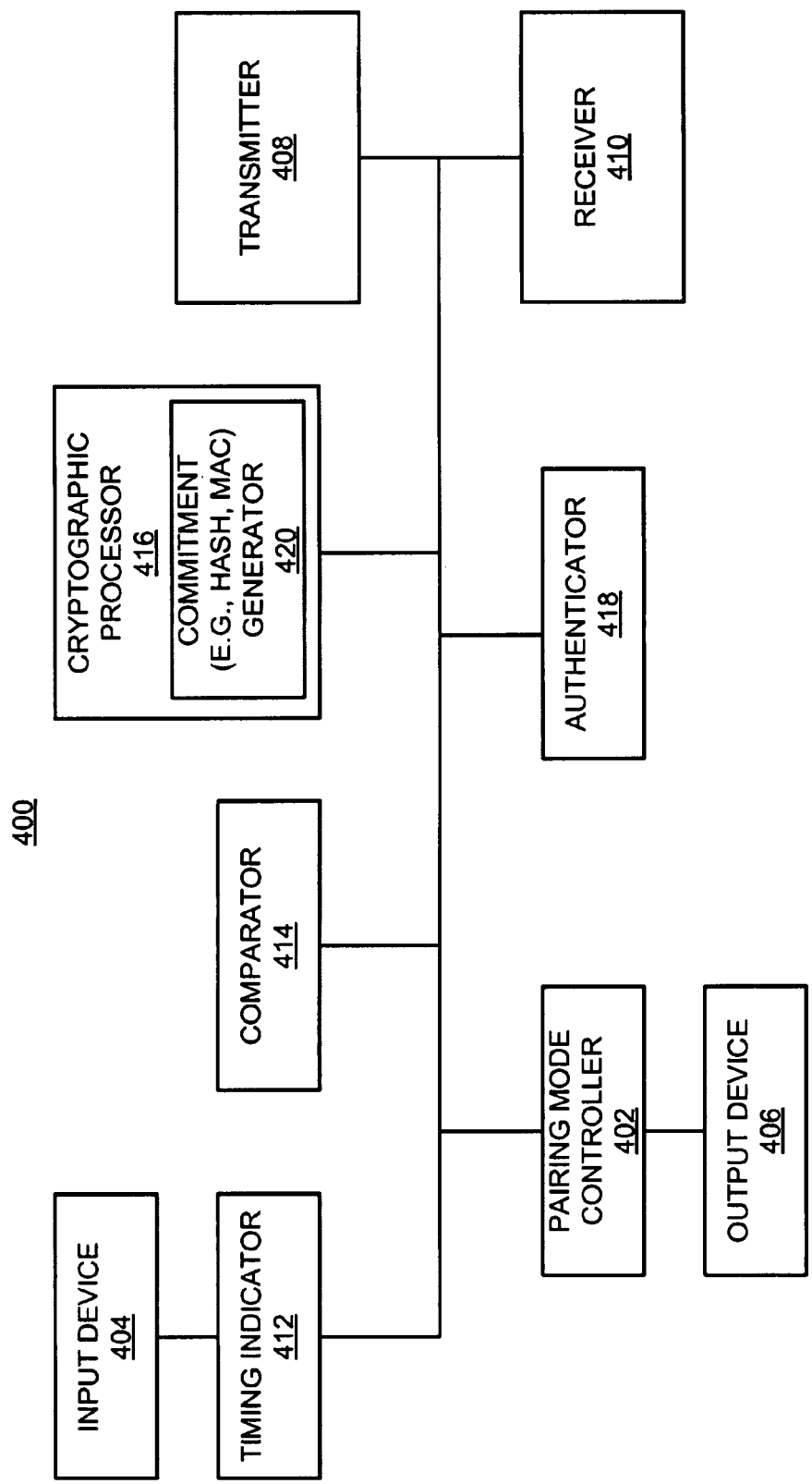
FIG. 4 is a simplified block diagram of several sample aspects of a wireless device.

For illustration purposes, the operations of FIG. 3 will be discussed in the context of being performed by various components of a wireless device 400 as shown in FIG. 4. It should be appreciated, however, that the illustrated components of the wireless device 400 are merely representative of components that may be employed here and that one or more of the operations of FIG. 3 may be performed by or in conjunction with other suitable components.

In addition, for convenience the operations of both an initiator device and responder device will be discussed in conjunction with the single wireless device 400 depicted in FIG. 4. Thus, while the discussion below will refer to similar components it should be understood that the initiator device and the responder device will comprise separate devices 400.

At blocks 302 and 304 the two devices are set to pairing mode. In some implementations pairing mode may be initiated by a user using a user interface (e.g., interface 106 in FIG. 1) to invoke the corresponding functionality on the device (e.g., device 102). Here, an underlying protocol may enable each device to: (1) find its peer; and (2) determine which device is the initiator and which is the responder. The designations of initiator and responder may be determined in various ways. For example, in some implementations the responder is the device with a user interface (e.g., an LED). In some implementations the devices may each generate a random number whereby the device that generates, for example, the larger number is selected as the initiator.

In FIG. 4 the initiation of the pairing mode may be accomplished, for example, through the use of a pairing mode controller 402 that receives an input from an input device 404, causes an appropriate indication to be provided on an output device 406 (if applicable), and transmits an appropriate indication to another device via a transmitter 408 (if applicable). For example, at least one of the initiator and responder devices may inform the user that it is in pairing mode (e.g., LED blinking). In some implementations pairing mode may simply be initiated by the user pressing the same user input devices (e.g., buttons) that are used for the synchronization operations. In other implementations a wireless device may support other techniques (e.g., menu selection) to enable pairing mode.

In some implementations similar operations may be performed here by the responding devices. Alternatively, one of the devices may simply be set to pairing mode upon reception of an appropriate message from the other device. In this case, a receiver 410 may receive the message from the other device and provide the associated information to the pairing mode controller 402 that invokes pairing mode operations on that device (e.g., device 104).

The devices 102 and 104 may be in pairing mode for a designated period of time (e.g., for $T_{pair\_enabled}$ seconds). This time period may be defined large enough so that both devices may enter pairing mode without synchronization.

In some implementations the initiator device and/or the responder device may generate an indication to inform the user when to commence actuating the input devices of the initiator and responder devices. Such an indication may comprise, for example, a visual command on a display, a specific configuration of lighting elements (e.g., turning on or turning off LEDs), a vibration, or an audio command.

At block 306 the initiator device waits until its local input device (e.g., device 404) has been actuated. As mentioned above, in some implementations this may involve a user pressing a button of the initiator device at the same time he or she presses a button on the responder device. Once the initiator device detect the local actuation event, at block 308 a timing indicator 412 and the transmitter 408 of the initiator device cooperate to transmit a pair-request message to the responder device. The receiver 410 of the responder device receives this pair-request message as represented by block 310. As mentioned above, this time at which this message is received may serve as an indication as to the timing of the actuation at block 306.

Similar to the initiator device operation of block 306, at block 312 the responder device waits until its local input device (e.g., device 404) has been actuated. In practice, the detection operation of block 312 may be made before or after the pair-request message is received at block 310, depending on the relative timings of the actuations of the devices and the processing time for each device to identify an actuation and to process the pair-request message.

At block 314 a comparator 414 of the responder device compares the timing of the actuation of block 312 with the timing of the receipt of the request message at block 310. The operation may involve, for example, determining the difference between these two timings and comparing the resulting difference with a threshold.

For example, assuming the button was pressed (block 312) before the pair-request message was received, upon receipt of the pair-request message the comparator 414 may compare the current time t with the recorded timing of a button-pressing event at block 312, denoted by $T_{resp\_button\_pressing}$. Thus, the synchronization test of blocks 314 and 316 may comprise determining whether: $|t-T_{resp\_button\_pressing}|<T_{max}$.

Here, $T_{max}$ denotes the maximal allowable time interval between t and $T_{resp\_button\_pressing}$ when the two buttons are pressed by the same person. In some implementations $T_{max}$ may be on the order of, for example, less than 0.1 seconds. Here, the message transmission delay may be ignored because it typically is much smaller than $T_{max}$. The button sensing delay may, in large part, be compensated at the other wireless device.

As represented by block 316, if the synchronization test did not pass the responder device transmits a pair-deny message at block 318 to the initiator device. The operations of both devices may then go back to the beginning of the pairing process. In this case, there may be no change in the user interface (e.g., LED still blinking).

If, on the other hand, the synchronization test did pass at block 316, the pairing process may continue. In some implementations the synchronization test involves multiple actuations by the user. For example, a subsequently detected actuation may involve the user releasing the buttons. Consequently, one or both of the devices may inform the user to keep holding the buttons (e.g., as indicated by maintaining the LED continuously ON). It should be appreciated here that similar functionality may be provided in other ways (e.g., by waiting for the local button to be pressed again).

At block 320 the responder device than waits for a defined period of time before performing the next operation (e.g., waiting for another actuation). Similarly, as represented by block 322, the initiator device waits for the defined period of time after transmitting a message at block 308 before performing its next operation (e.g., waiting for another actuation). Here, the defined period of time may comprise a fixed time $T_{FIXED}$ plus a random time $T_{RAND}$.

At block 324 the responder device waits until its local button is released. Here, at the expiration of the time period of block 320, the responder device may inform the user to simultaneously release the two buttons (e.g., LED blinking).

As represented by block 326, once the local actuation is detected at block 324, the responder device transmits a pair-acknowledgment message to the initiator device. Again, this operation may be performed by the cooperation of the timing indicator 412 and the transmitter 408 of the responder.

The receiver 410 of the initiator device receives this pair-acknowledgement message as represented by block 328. The time at which this message is received may thus serve as an indication as to the timing of the actuation at block 324.

As represented by block 330, the initiator device waits until its local input device (e.g., device 404) has again been actuated. As mentioned above, in some implementations this may involve the user releasing a button or performing some other suitable act. In practice, the detection operation of block 330 may occur before or after the pair-request message is received at block 328.

At block 332 the comparator 414 of the initiator device compares the timing of the actuation of block 330 with the timing of the receipt of the acknowledgment message at block 328. Again, this operation may involve determining the difference between these two timings and comparing the resulting difference with a threshold. For example, the initiator device may compare the current time t with the recorded time of, for example, the local button releasing event, denoted by $T_{init\_button\_releasing}$. The synchronization test at blocks 332 and 334 may thus involve determining whether: $|t-T_{init\_button\_releasing}|<T_{max}$.

As represented by block 334, if the synchronization test did not pass, at block 336 the initiator device transmits a pair-deny message to the responder device. The pairing process may then be aborted.

If, on the other hand, the synchronization test did pass at block 334, the cryptographic processor component 416 may optionally perform a key agreement calculation at block 338. This operation may relate to, for example, providing one or more keys for use in subsequent operations of the initiator and responder devices.

At block 340 the initiator device may transmit a pair-confirm message to the responder device. In some implementations this message may include authentication-related information (e.g., that is used to generate a key to be used for subsequent secure operations). In the event this message is not received at the responder device the current pairing operation is aborted as represented by block 342.

On the other hand, if the confirmation message is received a block 342, the responding device may optionally perform its own key agreement calculation at block 344. Here, the pair-request and pair-acknowledgement messages may have their own payloads. Consequently, a key to be used for securing subsequent operations may be generated from them. The key agreement scheme may be a Diffie-Hellman algorithm or any entropy mixing scheme (e.g., SHA-256 (payload1||payload2)). When a Diffie-Hellman algorithm is used, the payload may comprise the sender's public key information and the confidentiality of the exchange key is protected. For example, the pair-request message may include the initiator's public key and the pair-acknowledgement message may include the responder's public key.

As represented by blocks 346 and 348 the initiator and responder devices may then successfully terminate the pairing mode. Here, the responder device may inform the user of a successful pairing (e.g., the LED is continuously ON for a period of time, and is then turned OFF). An authenticator component 418 of each device may then perform any other operations that need to be performed in conjunction with authenticating these devices to one another.

It should be appreciated that various modifications may be made to one or more of the above operations. For example, holding the buttons may not be considered necessary, or multiple clicks of buttons may be used for additional assurance.

A number of advantages may be provided through the use of the above pairing operations. For example, if a hacker wants to launch a man-in-the-middle attack, the hacker has to send pair-request or pair-confirm synchronized with the two target devices. Since the two target devices are being physically held by their real owner, it is highly unlikely that the hacker can figure out the right timing to send these messages. That is, one person can click the buttons within a time limit that is much smaller than the normal human reaction time. Consequently, by the time an observer sees a button being pressed and tries to press the button on their intruding device, it will be too late.

A hacker also may mount an attack that involves sending a large number of fake pair-request or pair-confirm messages continuously with the intent that one of them is received within the legal time interval. To thwart such an attack, the receiver of the target device (either the initiator or the responder) may only record the first valid message from the other end and may reject (e.g., ignore or discard) the repeated messages of the same type. By doing so, only the first of these fake messages will be recorded. In this case, however, it is unlikely that this fake message will be received within the legal time interval. For example, the fake message would likely be received before actuation of a receiving device's input device.

Figure 5A:
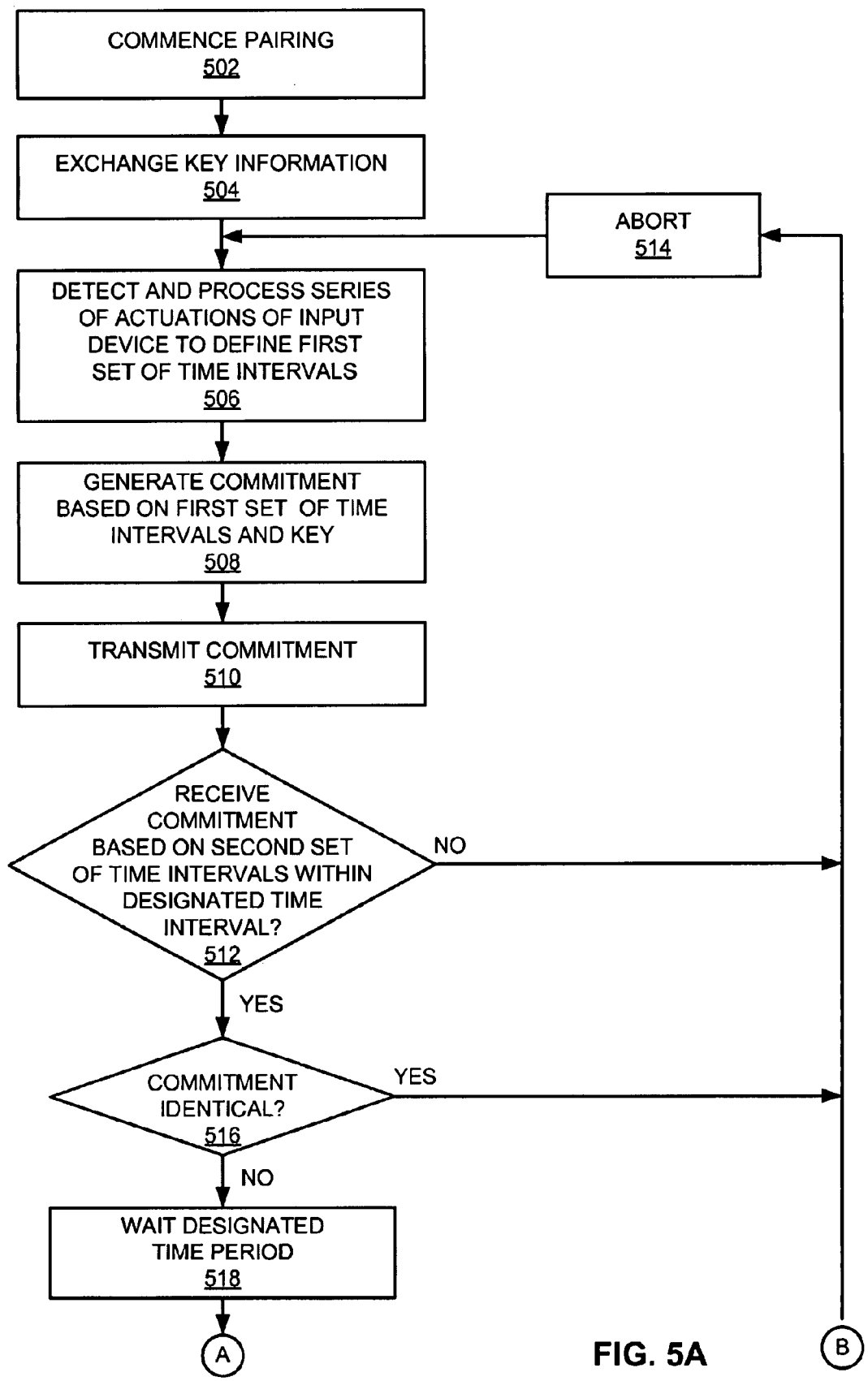
FIGS. 5A and 5B, is a flowchart of several sample aspects of operations that may be performed to pair two wireless devices based on differences between time durations defined by a series of actuations of a user input device of each wireless device.
Figure 5B:
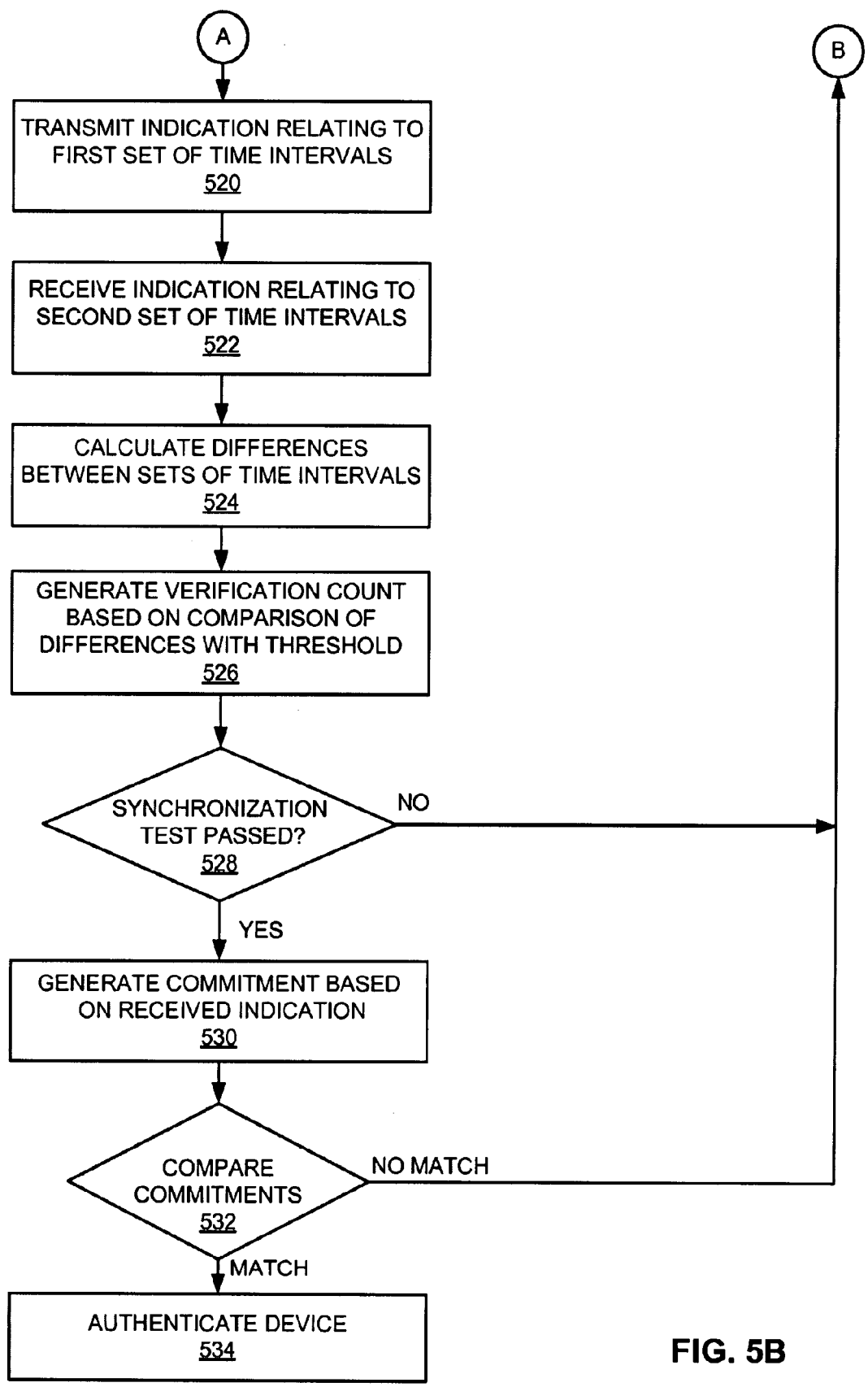

Referring now to FIG. 5, another type of synchronization test that is based on time intervals between actuations will be treated in detail. In a similar manner as above, the operations of FIG. 5 will be discussed in the context of the wireless device 400. Again, it should be appreciated that the referenced components are merely representative and that the operations of FIG. 5 may be performed by or in conjunction with other suitable components.

Figure 6:
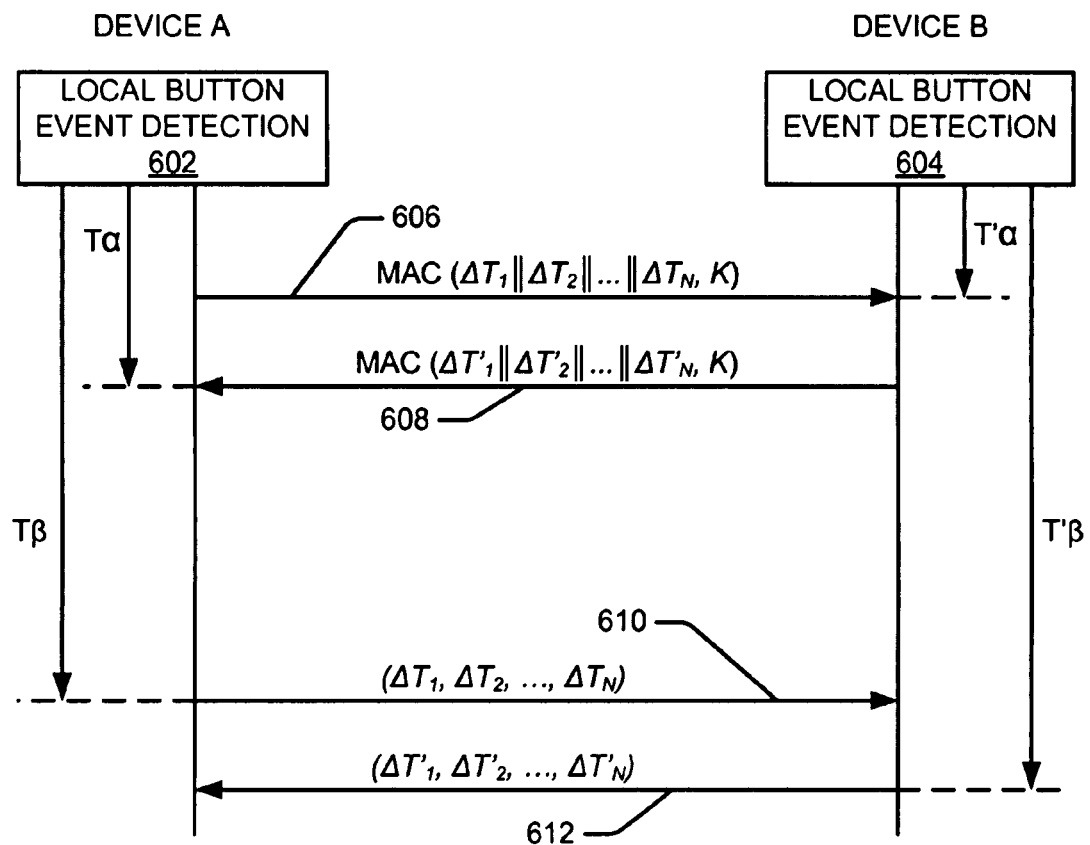
FIG. 6 is a simplified diagram of sample timing relating to the operations of FIG. 5.

FIG. 6 illustrates sample timing relationships between messages that may be transmitted between a pair of wireless device (e.g., devices 102 and 104) in conjunction with, for example, the operations of FIG. 5. Briefly, at blocks 602 and 604 these operations involve detection of a local button event by each device (designated device A and device B in FIG. 6). In this case, the local button events at the devices A and B relate to a series of actuations that define a set of time intervals (designated $\Delta T_1-\Delta T_N$ and $\Delta T'_1-\Delta T'_N$, respectively). In this example, upon detection of the local button event, each device generates a message authentication code ("MAC") based on the corresponding set of time intervals and a cryptographic key K, and transmits the message authentication code to the other device as represented by the arrows 606 and 608. Each of the devices A and B then waits for a defined period of time (Tα and T'α, respectively) to receive a message from the other device. In the event the verification tests associated with these messages passes (as be discussed in more detail below in conjunction with FIG. 5), device A and device B wait for another defined period of time (Tβ and T'β, respectively), then transmit messages relating to their respective set of time intervals as represented by the arrows 610 and 612.

Sample operations that may be performed by wireless devices A and B will now be discussed in more detail in conjunction with FIG. 5. Since the operations of these devices are complementary, FIG. 5 simply depicts the operations of one of the wireless devices.

At block 502 the wireless devices commence the pairing procedure. These operations may be similar to the pairing commencement operations discussed above in conjunction with blocks 302 and 304.

At block 504 the wireless devices may exchange key information or otherwise cooperate to enable each wireless device to obtain one or more keys to be used in conjunction with the pairing operation. In some implementations the operations of block 504 are performed before the commencement of the pairing procedure. Here, the cryptographic processors 416 (FIG. 4) of the devices may cooperate to generate a key K to be used to generate message authentication codes. In general, the devices determine the value K in a manner that ensures that no other device may establish an identical key with both of these devices.

One method of generating such a key is this is through the use of a Diffie-Hellman key agreement. As noted above, the key K used in the message authentication code is determined by both sides of the key exchange. Thus, a man-in-the-middle could try to set up this protocol separately with the two devices. However, when the Diffie-Hellman key exchange is used, it is relatively infeasible for the man-in-the-middle to establish the same key K for two separate processes. Here, replaying the same message authentication code between the two targets would fail.

To save manufacturing cost, the two devices may use ephemeral Diffie-Hellman keys to derive the key K. By doing so, each device may generate a Diffie-Hellman key pair when it boots up or each time before device authentication is required. Also, in devices with restricted memory and computation power, elliptic curve Diffie-Hellman may be used for key exchange.

To perform device authentication, or some other operation, the user again physically holds the two devices (e.g., one in each hand). The user then picks several random timings to simultaneously press and/or release a button on each device.

At block 506 the timing indicator 412 of each wireless device detects the series of actuations at its respective input device (e.g., device 404) and defines a respective set of time intervals. Here, there are two sequences of timings, one recorded by device A: $(T_0, T_1, T_2, \ldots, T_N)$, and another recorded by device B: $(T'_0, T'_1, T'_2, \ldots, T'_N)$.

Two sequences of time differences may thus be computed from these series of timings for device A and device B, respectively: $(\Delta T_1, \Delta T_2, \ldots, \Delta T_N)$ and $(\Delta T'_1, \Delta T'_2, \ldots, \Delta T'_N)$, where $\Delta T_i = T_i - T_{i-1}$ and $\Delta T'_i = T'_i - T'_{i-1}$, where $(1 \leq i \leq N)$.

Each time interval in a set thus indicates the amount of time that elapsed between unique pairs of successive actuations. For example, the first time interval in a set may correspond to the elapsed time between the first actuation and the second actuation. The second time interval in a set may then correspond to the elapsed time between the second actuation and the third actuation.

Although the two devices may not have synchronized clocks, the two sequences of time differences should contain very similar values since these button events are triggered by two fingers that are well synchronized by a human being. Consequently, their difference $(\Delta T_i - \Delta T'_i)$ should be less than a threshold, $\Delta T_{th}$.

At block 508 a commitment generator 420 (e.g., a hash or message authentication code generator) of each wireless device generates a commitment value (e.g., hash code or message authentication code) or performs some other suitable operation based that device's set of time intervals. For example, in some implementations the wireless device A generates a message authentication code based on $(\Delta T_1 \| \Delta T_2 \| \ldots \| \Delta T_N)$ and K while the wireless device B generates a message authentication code based on $(\Delta T'_1 \| \Delta T'_2 \| \ldots \| \Delta T'_N)$ and K. Here, "$\|$" denotes concatenation, and all time differences may be expressed as bit strings. It should be appreciated that in other implementations the time interval data may be manipulated in other ways (e.g., summed). In addition, it should be appreciated that the commitment generator 420 may implement other types of keyed hash algorithms including, for example, HMAC or may implement a block cipher in CBC-MAC or CMAC mode.

In some aspects, a commitment scheme may involve generating a commitment based on a "secret" such as the time intervals and, optionally, other data to be authenticated and providing the commitment to another device. The other device performs complementary operations. Here, it may be impossible or impractical for a device to determine the "secret" of the other device based on the received commitment. Thus, a given device may not use the other device's "secret" to generate its commitment. After the above exchange, a subsequent verification operation involves sending the "secret" (e.g., the time intervals) to the other device. In this way, each device may use the "secret" and the commitment it received to authenticate the other device.

In general, the operations of block 508 (and block 530 discussed below) relate to performing a cryptographic operation on the data to be transmitted. Consequently, similar functionality may be provided through the use of other cryptographic techniques such as a digital signature. Thus, in this case the commitment generator 420 may comprise a digital signature generator.

At block 510 each wireless device transmits its commitment (e.g., message authentication code) to the other wireless device. In some aspects this message comprises an indication relating to the timing of the actuations of block 506. This transmission may be asynchronous with respect to the other wireless device. That is, the time at which one wireless device transmits its message authentication code may not be based on the time at which the other wireless device transmits its message authentication code.

As represented by block 512, each device waits to receive a commitment (e.g., message authentication code) from the other device. For example, in the event the message authentication code is not received within a defined period of time the process may be aborted as represented by block 514 (e.g., and the process is restarted from button event detection). In some implementations the operations of block 512 involve the comparator 414 determining the time difference between a time relating to the actuation times (e.g., the last local button event time $T_N$ or $T'_N$) and the time of receipt of the incoming message authentication code at block 512. In some aspects, this difference value must be less than a predefined threshold $\Delta T_\alpha$. The incoming message authentication code for device A may thus be deemed valid if: $(T_\alpha - T_N) < \Delta T_{\alpha-max}$. Similarly, the incoming message authentication code for device B may be deemed valid if: $(T'_\alpha - T'_N) < \Delta T_{\alpha-max}$.

As represented by block 516, the process may be aborted in the event the two devices send identical commitments (e.g., message authentication codes) to each other. In this way, the pairing scheme prevents another device from simply transmitting back, for example, a message authentication code that it received from either device A or device B (e.g., in an attempted "replay attack").

If the incoming message authentication code is valid, at block 518 each device remains idle until more than a defined period of time (e.g., $\Delta T_{\beta-min}$) elapses after a designated time relating to the corresponding actuation times (e.g., the last local button event $T_N$ or $T'_N$). Here, $\Delta T_{\beta-min}$ may be defined to be less than or equal to $\Delta T_{\alpha-max}$. Thus, for device A: $(T_\beta - T_N) > \Delta T_{\beta-min}$, and for device B: $(T'_\beta - T'_N) > \Delta T_{\beta-min}$.

The use of timing constraints as described above may prevent a man-in-the-middle attack where the attacker fails in authentication with one target but obtains the genuine sequence of time differences. In such a case, the attacker could try to use this sequence to authenticate to the other target. However, the man-in-the-middle will not pass the timing check for $T_\alpha$ and $T_\beta$ because it is too late to send the correct message authentication code. That is, under the scheme set forth above a device will not transmit its set of time intervals (line 610 or 612 in FIG. 6) until it receives a commitment such as the message authentication code (line 606 or 608 in FIG. 6) from the other device.

At block 520 each wireless device transmits its set of time intervals to the other side for verification. As represented by block 522, each wireless device thereby receives the corresponding set of time intervals from the other device. This message thus comprises an indication relating to the timing of the actuations of block 506.

At block 524 the comparator 414 calculates the difference between corresponding time intervals of each set of time intervals. For example, the comparator 414 determines the difference in time between the first time interval in the set of intervals generated at device A and the first time interval in the set of intervals generated at device B. A similar time difference may then be calculated for each time interval in each set.

At block 526 the comparator 414 generates a verification count based on these time differences. As an example, the operations of blocks 524-528 may take the form of Equation 1.

$$\sum_{i=1}^{n} f(|\Delta T_i - \Delta T'_i|, \Delta T_{th}) \geq m \qquad \text{EQUATION 1}$$

where f(x, y) returns 1 if x<y and 0 if x≥y.

Here, the defined value m is the minimum number of successful tests that is deemed acceptable to pass the verification process (m≤n). In other words, this test determines whether an acceptable number of the time differences are within the range defined by $\Delta T_{th}$. At block 528, in the event an acceptable number of the time differences are not within the range defined by $\Delta T_{th}$, the pairing process may be aborted.

On the other hand, if the synchronization test passed at block 528, the wireless device may verify that a commitment (e.g., message authentication code) generated from the set of time intervals received at block 522 matches the commitment (e.g., message authentication code) received at block 512. For example, at block 530 the message authentication code generator 420 may generate a message authentication code based on the set of time intervals received at block 522 and the key K. The comparator 414 may then compare this message authentication code with the message authentication code received from the other wireless device at block 512. Exchanging the message authentication code at the beginning of the protocol (e.g., at blocks 510-512) may thereby prevent either side from cheating. For example, once the message authentication code is transmitted, it may be infeasible to find another input message (e.g., sequence of time differences) with the same message authentication code.

At block 532, if the commitment (e.g., message authentication code) based on the incoming message from block 522 does not match the commitment (e.g., message authentication code) from block 512, the pairing process may be aborted. Otherwise, the other wireless device may be deemed successfully authenticated (block 534).

Various advantages may be achieved through the use of the teachings herein. For example, in some aspects the techniques taught herein may be employed to prevent a malicious device from capturing finger movement timings through eavesdropping and analysis of wireless traffic during device pairing. In some aspects an implementation based on the teachings herein may not require complicated protocol or high cost device provisioning.

The use of the MAC associates the key K with the device authentication process. As a result, K is authenticated at block 534 as well. In other words, K may have been initially exchanged between devices that did not trust one another. By using K in the message authentication code, however, K is authenticated by the above distance-based authentication whereby trust derives from the same person operating the devices. Once authenticated, K may be used for subsequent cryptographic operations (e.g., encryption, authentication, and so on).

It should be appreciated that a commitment operation may be implemented in a variety of ways. For example, cryptographic operations other than MAC-based operations may be employed here. In addition, any of the operations taught herein may be used to associate additional data for authentication. Also, a pre-shared secret key K may not be required. For example, the commitment value can be the hash of (time intervals||Diffie-Hellman public key||device identifier) so that the Diffie-Hellman public key and the identifier of the other device are authenticated at block 534. An advantage of such an approach is that a time consuming and computationally intensive key exchange (e.g., a Diffie-Hellman operation to provide K to each device) need not be performed until after the devices authenticate one another. Also, it should be appreciated that the commitment may be based on any type of data that needs to be authenticated. Thus, the above MAC operation may be based on other data in addition to or other than one or more of the pre-shared key K, the public key, and the device ID discussed above.

In some implementations a commitment scheme may employ encryption and decryption operations. For example, the commitment scheme may involve using a key to encrypt a secret (e.g., time interval information). The resulting cipher text is transmitted to another device. Once the complementary cipher text is received from the other device, the key is transmitted to the other device. Each device may then use the key it receives to decrypt the received cipher text to thereby obtain the "secret" of the other device. This restored "secret" may then be compared with the received "secret" (e.g., the time intervals) to authenticate the other device.

In some implementations a commitment may be based on information that is provided to prevent a replay attack. For example, a first device may generate a MAC based on the time intervals and some type of information (referred to as a device identifier in the following discussion) that distinguishes the first device (e.g., an initiator) from a second device (e.g., a responder). The first device transmits the MAC to the second device that is expected to perform a complementary operation. After receiving a MAC from the other device, each device transmits its device identifier (e.g., "0" for the first device and "1" for the second device) in the clear. For example, the device identifier may be transmitted in the plain text of the MAC message (e.g., at block 510 in FIG. 5) or along with the time interval information. Thus, if the second device attempts to "replay" the first device's MAC back to the first device, this will be apparent because the MAC from the second device will be based on the wrong device identifier (e.g., "0"). Similarly, in conjunction with the replay the second device may transmit the device identifier of the first device (e.g., "0") in the clear. In this case, the first device may readily determine that this is a replay upon checking the device identifier. Referring to FIG. 5, the operation of block 516 (or some other block) may thus be replaced (or augmented) with checking the received device identifier to make sure that it is different than the device identifier of the device performing the check (e.g., the first device above).

Figure 7:
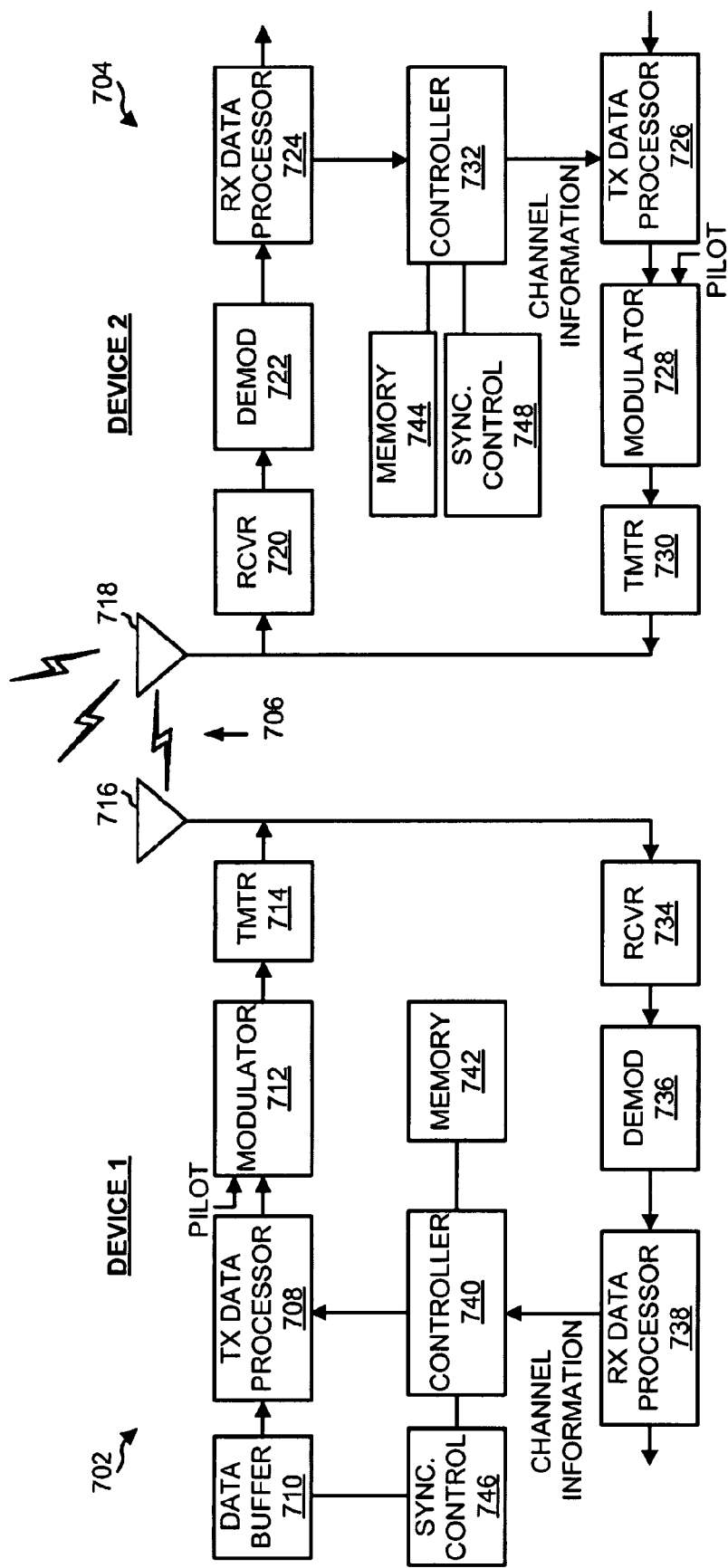
FIG. 7 is a simplified block diagram of several sample aspects of communication components.

The teachings herein may be incorporated into a device employing various components for communicating with at least one other device. FIG. 7 depicts several sample components that may be employed to facilitate communication between devices. Here, a first device 702 and a second device 704 are adapted to communicate via a wireless communication link 706 over a suitable medium.

Initially, components involved in sending information from the device 702 to the device 704 (e.g., a reverse link) will be treated. A transmit ("TX") data processor 708 receives traffic data (e.g., data packets) from a data buffer 710 or some other suitable component. The transmit data processor 708 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 712 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 714 processes (e.g., converts to analog, filters, amplifies, and frequency upconverts) the output chip stream and generates a modulated signal, which is then transmitted from an antenna 716.

The modulated signals transmitted by the device 702 (along with signals from other devices in communication with the device 704) are received by an antenna 718 of the device 704. A receiver ("RCVR") 720 processes (e.g., conditions and digitizes) the received signal from the antenna 718 and provides received samples. A demodulator ("DEMOD") 722 processes (e.g., demodulates and detects) the received samples and provides detected data symbols, which may be a noisy estimate of the data symbols transmitted to the device 704 by the other device(s). A receive ("RX") data processor 724 processes (e.g., symbol demaps, deinterleaves, and decodes) the detected data symbols and provides decoded data associated with each transmitting device (e.g., device 702).

Components involved in sending information from the device 704 to the device 702 (e.g., a forward link) will be now be treated. At the device 704, traffic data is processed by a transmit ("TX") data processor 726 to generate data symbols. A modulator 728 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 730 and transmitted from the antenna 718. In some implementations signaling for the forward link may include power control commands and other information (e.g., relating to a communication channel) generated by a controller 732 for all devices (e.g. terminals) transmitting on the reverse link to the device 704.

At the device 702, the modulated signal transmitted by the device 704 is received by the antenna 716, conditioned and digitized by a receiver ("RCVR") 734, and processed by a demodulator ("DEMOD") 736 to obtain detected data symbols. A receive ("RX") data processor 738 processes the detected data symbols and provides decoded data for the device 702 and the forward link signaling. A controller 740 receives power control commands and other information to control data transmission and to control transmit power on the reverse link to the device 704.

The controllers 740 and 732 direct various operations of the device 702 and the device 704, respectively. For example, a controller may determine an appropriate filter, reporting information about the filter, and decode information using a filter. Data memories 742 and 744 may store program codes and data used by the controllers 740 and 732, respectively.

FIG. 7 also illustrates that the communication components may include one or more components that perform operations relating to synchronization tests as taught herein. For example, a synchronization ("SYNC.") control component may cooperate with the controller 740 and/or other components of the device 702 to send/receive synchronization-related information to/from another device (e.g., device 704). Similarly, a synchronization control component 748 may cooperate with the controller 732 and/or other components of the device 704 to send/receive synchronization-related information to/from another device (e.g., device 702).

A wireless device may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 408 and receiver 410) that may include various components (e.g., signal generators and signal processors) that facilitate communication over a wireless medium.

In some aspects a wireless device may communicate via an impulse-based wireless communication link. For example, an impulse-based wireless communication link may utilize ultra-wideband pulses that have a relatively short length (e.g., on the order of a few nanoseconds) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Figure 8:
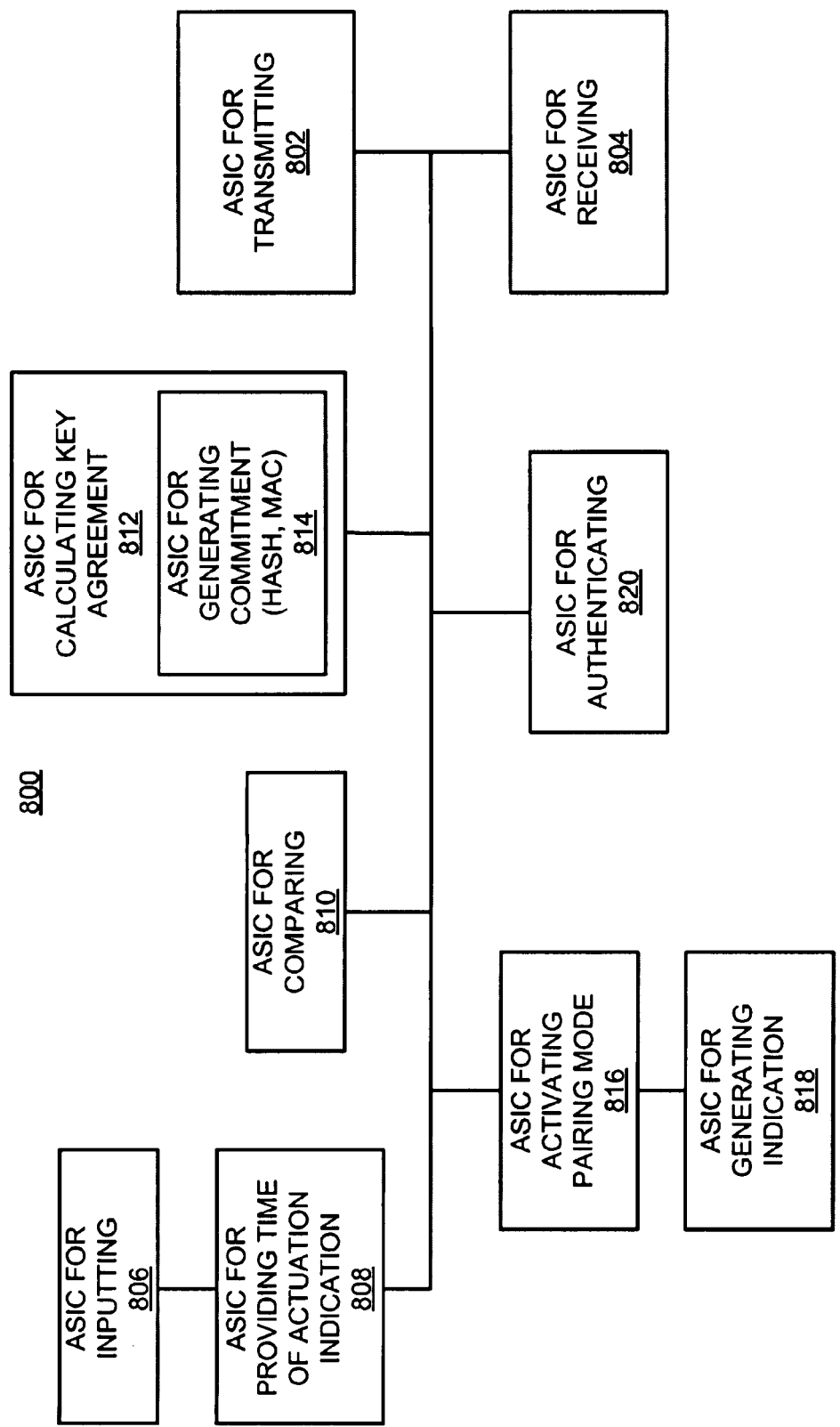
FIG. 8 is a simplified block diagram of several sample aspects of an apparatus configured to support a synchronization test.

The components described herein may be implemented in a variety of ways. Referring to FIG. 8, an apparatus 800 is represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatus 800 may include one or more modules that may perform one or more of the functions described above with regard to various figures. For example, an ASIC for transmitting 802 may correspond to, for example, a transmitter as discussed herein. An ASIC for receiving 804 may correspond to, for example, a receiver as discussed herein. An ASIC for inputting 806 may correspond to, for example, an input device as discussed herein. An ASIC for providing time of actuation indication 808 may correspond to, for example, a timing indicator as discussed herein. An ASIC for comparing 810 may correspond to, for example, a comparator as discussed herein. An ASIC for calculating key agreement 812 may correspond to, for example, a cryptographic processor as discussed herein. An ASIC for generating a commitment (hash, MAC) 814 may correspond to, for example, a commitment (e.g., hash/MAC) generator as discussed herein. An ASIC for activating pairing mode 816 may correspond to, for example, a pairing mode controller as discussed herein. An ASIC for generating indication 818 may correspond to, for example, an output device as discussed herein. An ASIC for authenticating 820 may correspond to, for example, an authenticator as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatus 800 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIG. 8 as well as other components and functions described herein, may be implemented using any suitable means. Such means also may be implemented, at least in part, using corresponding structure as taught herein. For example, the components described above in conjunction with the "ASIC for" components of FIG. 8 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations are used herein as a convenient method of distinguishing between two or more different devices, sets, etc. Thus, a reference to first and second devices or sets does not mean that only two devices or sets may be employed there or that the first device or set must precede the second device or set in some manner.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of authenticating, comprising:
providing a first indication relating to at least one time of actuation of a first user input device that is associated with a first device;
receiving a second indication relating to at least one time of actuation of a second user input device that is associated with a second device;
comparing the first indication with the second indication to determine whether the at least one time of actuation of the first user input device is similar to the at least one time of actuation of the second user input device;
authenticating the second device based on the comparison; and
rejecting, during a synchronization test and after the reception of the second indication, any indications purporting to be representative of at least one time of actuation of the second user input device, wherein the first indication is provided and the second indication is received in conjunction with the synchronization test.

2. The method of claim 1, wherein:
the first indication indicates a time at which the first user input device was actuated; and
the second indication relates to a time at which the second user input device was actuated.

3. The method of claim 2, wherein the second indication indicates a time at which a message from the second device was received at the first device.

4. The method of claim 2, wherein:
the comparison comprises calculating a time difference between the time at which the first user input device was actuated and the time at which the second user input device was actuated; and
the authentication of the second device is based on whether the time difference is less than or equal to a threshold time interval.

5. The method of claim 4, further comprising transmitting, if the time difference is less than or equal to the threshold time interval, a third indication relating to another time the first user input device was actuated.

6. The method of claim 5, wherein:
the first indication indicates a time at which the first user input device was engaged; and
the third indication indicates a time at which the first user input device was disengaged.

7. The method of claim 4, further comprising performing a key agreement calculation if the time difference is less than or equal to the threshold time interval, wherein the key agreement calculation is based on:
a first cryptographic key associated with the first device; and
a second cryptographic key associated with the second device and received in conjunction with the second indication.

8. The method of claim 7, wherein the key agreement calculation provide a cryptographic key for securing communication between the first and second devices.

9. The method of claim 1, wherein:
the at least one time of actuation of the first user input device comprises a plurality of actuation times that define a first set of time intervals; and
the at least one time of actuation of the second user input device comprises a plurality of actuation times that define a second set of time intervals.

10. The method of claim 9, wherein the comparison comprises:
calculating a series of time differences between each interval of the first set of time interval and a corresponding interval of the second set of time intervals; and
generating a verification count based on how many of the time differences are less than or equal to a threshold time interval.

11. The method of claim 10, wherein the authentication of the second device is based on whether the verification count is greater than or equal to a threshold count.

12. The method of claim 9, further comprising receiving a first commitment value that is based on the second set of time intervals.

13. The method of claim 12, wherein the first commitment value comprises a hash code or a message authentication code.

14. The method of claim 12, wherein the first commitment value is further based on data to be authenticated.

15. The method of claim 14, wherein the data to be authenticated comprises at least one of the group consisting of: a pre-shared key, a public key, and a device identifier.

16. The method of claim 12, wherein the first commitment value comprises a message authentication code that is further based on a cryptographic key that is shared by the first and second devices.

17. The method of claim 12, further comprising:
generating a second commitment value based on the second set of time intervals;
wherein the authentication of the second device is based on whether the second commitment value equals the first commitment value.

18. The method of claim 12, further comprising:
determining a time difference between a time of receipt of the first commitment value and a verification start time associated with the at least one time of actuation of the first user input device;
wherein the authentication of the second device is based on whether the time difference is less than or equal to a threshold time interval.

19. The method of claim 18, further comprising transmitting, if the time difference is less than or equal to the threshold time interval, a third indication relating to the at least one time of actuation of the first user input device.

20. The method of claim 19, wherein the third indication is transmitted a defined period of time after the verification start time.

21. The method of claim 12, further comprising transmitting a commitment value relating to the first set of time intervals.

22. The method of claim 9, wherein the authentication of the second device is based on the first set of time intervals being different than the second set of time intervals.

23. The method of claim 9, wherein the actuation times that define the first set of time intervals comprise a random sequence of times.

24. The method of claim 1, wherein each of the actuations comprises an engagement of a respective one of the user input devices or a disengagement of a respective one of the user input devices.

25. The method of claim 1, wherein the first user input device comprises a pushbutton, a keypad, a switch, or a touchscreen.

26. The method of claim 1, further comprising activating a pairing mode of the first device prior to acquiring the first indication.

27. The method of claim 1, further comprising generating an indication to initiate the actuation of the user input devices, after the authenticating.

28. The method of claim 27, wherein the generation of the indication comprises activating or deactivating a lighting element or providing an output on a display screen.

29. An apparatus for authenticating, comprising:
a timing indicator configured to provide a first indication relating to at least one time of actuation of a first user input device that is associated with a first device;
a receiver configured to receive a second indication relating to at least one time of actuation of a second user input device that is associated with a second device;
a comparator configured to compare the first indication with the second indication to determine whether the at least one time of actuation of the first user input device is similar to the at least one time of actuation of the second user input device; and
an authenticator configured to authenticate the second device based on the comparison, wherein the first indication is provided and the second indication is received in conjunction with a synchronization test, and the receiver is further configured to reject, during the synchronization test and after the receipt of the second indication, any indications purporting to be representative of at least one time of actuation of the second user input device.

30. The apparatus of claim 29, wherein:
the first indication indicates a time at which the first user input device was actuated; and
the second indication relates to a time at which the second user input device was actuated.

31. The apparatus of claim 30, wherein the second indication indicates a time at which a message from the second device was received at the first device.

32. The apparatus of claim 30, wherein:
the comparator is further configured to calculate a time difference between the time at which the first user input device was actuated and the time at which the second user input device was actuated; and
the authenticator is further configured to authenticate the second device based on whether the time difference is less than or equal to a threshold time interval.

33. The apparatus of claim 32, further comprising a transmitter configured to transmit, based on whether the time difference is less than or equal to the threshold time interval, a third indication relating to another time the first user input device was actuated.

34. The apparatus of claim 33, wherein:
the first indication indicates a time at which the first user input device was engaged; and
the third indication indicates a time at which the first user input device was disengaged.

35. The apparatus of claim 32, further comprising a cryptographic processor configured to perform a key agreement calculation if the time difference is less than or equal to the threshold time interval, wherein the key agreement calculation is based on:
a first cryptographic key associated with the first device; and
a second cryptographic key associated with the second device and received in conjunction with the second indication.

36. The apparatus of claim 35, wherein the key agreement calculation provide a cryptographic key for securing communication between the first and second devices.

37. The apparatus of claim 29, wherein:
the at least one time of actuation of the first user input device comprises a plurality of actuation times that define a first set of time intervals; and
the at least one time of actuation of the second user input device comprises a plurality of actuation times that define a second set of time intervals.

38. The apparatus of claim 37, wherein the comparator is further configured to:
calculate a series of time differences between each interval of the first set of time interval and a corresponding interval of the second set of time intervals; and
generate a verification count based on how many of the time differences are less than or equal to a threshold time interval.

39. The apparatus of claim 38, wherein the authenticator is further configured to authenticate the second device based on whether the verification count is greater than or equal to a threshold count.

40. The apparatus of claim 37, wherein the receiver is further configured to receive a first commitment value that is based on the second set of time intervals.

41. The apparatus of claim 40, wherein the first commitment value comprises a hash code or a message authentication code.

42. The apparatus of claim 40, wherein the first commitment value is further based on data to be authenticated.

43. The apparatus of claim 42, wherein the data to be authenticated comprises at least one of the group consisting of: a pre-shared key, a public key, and a device identifier.

44. The apparatus of claim 40, wherein the first commitment value comprises a message authentication code that is further based on a cryptographic key that is shared by the first and second devices.

45. The apparatus of claim 40, further comprising:
a commitment generator configured to generate a second commitment value based on the second set of time intervals;
wherein the authenticator is further configured to authenticate the second device based on whether the second commitment value equals the first commitment value.

46. The apparatus of claim 40, wherein:
the comparator is further configured to determine a time difference between a time of receipt of the first commitment value and a verification start time associated with the at least one time of actuation of the first user input device; and the authenticator is further configured to authenticate the second device based on whether the time difference is less than or equal to a threshold time interval.

47. The apparatus of claim 46, further comprising a transmitter configured to transmit, if the time difference is less than or equal to the threshold time interval, a third indication relating to the at least one time of actuation of the first user input device.

48. The apparatus of claim 47, wherein the third indication is transmitted a defined period of time after the verification start time.

49. The apparatus of claim 40, further comprising a transmitter configured to transmit a commitment value relating to the first set of time intervals.

50. The apparatus of claim 37, wherein the authenticator is further configured to authenticate the second device based on the first set of time intervals being different than the second set of time intervals.

51. The apparatus of claim 37, wherein the actuation times that define the first set of time intervals comprise a random sequence of times.

52. The apparatus of claim 29, wherein each of the actuations comprises an engagement of a respective one of the user input devices or a disengagement of a respective one of the user input devices.

53. The apparatus of claim 29, wherein the first user input device comprises a pushbutton, a keypad, a switch, or a touchscreen.

54. The apparatus of claim 29, further comprising a pairing mode controller configured to activate a pairing mode of the first device prior to acquiring the first indication.

55. The apparatus of claim 29, further comprising an output device configured to generate an indication to initiate the actuation of the user input devices.

56. The apparatus of claim 55, wherein the output device is further configured to activate or deactivate a lighting element or provide an output on a display screen.

57. An apparatus for authenticating, comprising:
means for providing a first indication relating to at least one time of actuation of a first means for inputting that is associated with a first device;
means for receiving a second indication relating to at least one time of actuation of a second means for inputting that is associated with a second device;
means for comparing the first indication with the second indication to determine whether the at least one time of actuation of the first means for inputting is similar to the at least one time of actuation of the second means for inputting; and
means for authenticating the second device based on the comparison, wherein the first indication is provided and the second indication is received in conjunction with a synchronization test, and the means for receiving rejects, during the synchronization text and after the receipt of the second indication, any indications purporting to be representative of at least one time of actuation of the second means for inputting.

58. The apparatus of claim 57, wherein:
the first indication indicates a time at which the first means for inputting was actuated; and
the second indication relates to a time at which the second means for inputting was actuated.

59. The apparatus of claim 58, wherein the second indication indicates a time at which a message from the second device was received at the first device.

60. The apparatus of claim 58, wherein:
the means for comparing calculates a time difference between the time at which the first means for inputting was actuated and the time at which the second means for inputting was actuated; and
the means for authenticating authenticates the second device based on whether the time difference is less than or equal to a threshold time interval.

61. The apparatus of claim 60, further comprising means for transmitting, based on whether the time difference is less than or equal to the threshold time interval, a third indication relating to another time the first means for inputting was actuated.

62. The apparatus of claim 61, wherein:
the first indication indicates a time at which the first means for inputting was engaged; and
the third indication indicates a time at which the first means for inputting was disengaged.

63. The apparatus of claim 60, further comprising means for performing a key agreement calculation if the time difference is less than or equal to the threshold time interval, wherein the key agreement calculation is based on:
a first cryptographic key associated with the first device; and
a second cryptographic key associated with the second device and received in conjunction with the second indication.

64. The apparatus of claim 63, wherein the key agreement calculation provide a cryptographic key for securing communication between the first and second devices.

65. The apparatus of claim 57, wherein:
the at least one time of actuation of the first means for inputting comprises a plurality of actuation times that define a first set of time intervals; and
the at least one time of actuation of the second means for inputting comprises a plurality of actuation times that define a second set of time intervals.

66. The apparatus of claim 65, wherein the means for comparing:
calculates a series of time differences between each interval of the first set of time interval and a corresponding interval of the second set of time intervals; and
generates a verification count based on how many of the time differences are less than or equal to a threshold time interval.

67. The apparatus of claim 66, wherein the means for authenticating authenticates the second device based on whether the verification count is greater than or equal to a threshold count.

68. The apparatus of claim 65, wherein the means for receiving receives a first commitment value that is based on the second set of time intervals.

69. The apparatus of claim 68, wherein the first commitment value comprises a hash code or a message authentication code.

70. The apparatus of claim 68, wherein the first commitment value is further based on data to be authenticated.

71. The apparatus of claim 70, wherein the data to be authenticated comprises at least one of the group consisting of: a pre-shared key, a public key, and a device identifier.

72. The apparatus of claim 68, wherein the first commitment value comprises a message authentication code that is further based on a cryptographic key that is shared by the first and second devices.

73. The apparatus of claim 68, further comprising:
means for generating a second commitment value based on the second set of time intervals;
wherein the means for authenticating authenticates the second device based on whether the second commitment value equals the first commitment value.

74. The apparatus of claim 68, wherein:
the means for comparing determines a time difference between a time of receipt of the first commitment value and a verification start time associated with the at least one time of actuation of the first means for inputting; and
the means for authenticating authenticates the second device based on whether the time difference is less than or equal to a threshold time interval.

75. The apparatus of claim 74, further means for transmitting, if the time difference is less than or equal to the threshold time interval, a third indication relating to the at least one time of actuation of the first means for inputting.

76. The apparatus of claim 75, wherein the third indication is transmitted a defined period of time after the verification start time.

77. The apparatus of claim 68, further comprising means for transmitting a commitment value relating to the first set of time intervals.

78. The apparatus of claim 65, wherein the means for authenticating authenticates the second device based on the first set of time intervals being different than the second set of time intervals.

79. The apparatus of claim 65, wherein the actuation times that define the first set of time intervals comprise a random sequence of times.

80. The apparatus of claim 57, wherein each of the actuations comprises an engagement of a respective one of the first and second means for inputting or a disengagement of a respective one of the first and second means for inputting.

81. The apparatus of claim 57, wherein the first means for inputting comprises a pushbutton, a keypad, a switch, or a touch-screen.

82. The apparatus of claim 57, further comprising means for activating a pairing mode of the first device prior to acquiring the first indication.

83. The apparatus of claim 57, further comprising means for generating an indication to initiate the actuation of the first and second means for inputting.

84. The apparatus of claim 83, wherein the means for generating an indication activates or deactivates a lighting element or provides an output on a display screen.

85. A non-transitory computer-readable storage medium comprising codes executable by at least one computer to:
provide a first indication relating to at least one time of actuation of a first user input device that is associated with a first device;
receive a second indication relating to at least one time of actuation of a second user input device that is associated with a second device;
compare the first indication with the second indication to determine whether the at least one time of actuation of the first user input device is similar to the at least one time of actuation of the second user input device;
authenticate the second device based on the comparison; and
reject, during a synchronization test and after the reception of the second indication, any indications purporting to be representative of at least one time of actuation of the second user input device, wherein the first indication is provided and the second indication is received in conjunction with the synchronization test.

\* \* \* \* \*